United States Patent [19]

Lusignea et al.

[11] Patent Number: 5,443,884
[45] Date of Patent: Aug. 22, 1995

[54] FILM-BASED COMPOSITE STRUCTURES FOR ULTRALIGHTWEIGHT SDI SYSTEMS

[75] Inventors: Richard W. Lusignea, Brighton, Mass.; Joseph J. Stanco, Clinton, N.Y.; Uday Kashalikar, Natick, Mass.

[73] Assignee: Foster-Miller, Inc., Waltham, Mass.

[21] Appl. No.: 834,283

[22] PCT Filed: Aug. 14, 1990

[86] PCT No.: PCT/US90/04587
§ 371 Date: Feb. 14, 1992
§ 102e Date: Feb. 14, 1992

[87] PCT Pub. No.: WO91/02646
PCT Pub. Date: Mar. 7, 1999

Related U.S. Application Data

[63] Continuation-in-part of Ser. No. 394,764, Aug. 15, 1989, abandoned.

[51] Int. Cl.⁶ ............................................. B32B 3/12
[52] U.S. Cl. .................................... 428/116; 428/118; 428/1; 428/73; 428/910; 425/396; 425/417; 156/197; 156/292; 264/299; 264/331.12; 264/331.19
[58] Field of Search ............... 428/116, 118, 1, 73, 428/910; 156/197, 292; 525/903; 425/383, 396, 417; 264/299, 331.12, 331.19

[56] References Cited

U.S. PATENT DOCUMENTS

| | | | |
|---|---|---|---|
| 3,356,555 | 12/1967 | Jackson | 156/205 |
| 4,554,119 | 11/1985 | Chenevey | 264/85 |
| 4,606,875 | 8/1986 | Chenevey et al. | 264/85 |
| 4,716,067 | 12/1987 | Moji et al. | 428/117 |
| 4,845,150 | 7/1989 | Kovar et al. | 524/602 |
| 4,898,924 | 2/1990 | Chenevey et al. | 528/183 |
| 4,937,125 | 6/1990 | Sanmartin et al. | 428/116 |
| 4,957,577 | 9/1990 | Huebner | 156/197 |
| 4,966,806 | 10/1990 | Lusignea et al. | 428/220 |
| 5,030,305 | 7/1991 | Fell | 156/197 |
| 5,135,783 | 8/1992 | Harvey et al. | 428/1 |

FOREIGN PATENT DOCUMENTS

| | | |
|---|---|---|
| 0240302 | 10/1987 | European Pat. Off. |
| 0284848 | 10/1988 | European Pat. Off. |
| 8706186 | 10/1987 | WIPO |

OTHER PUBLICATIONS

*World Patent Index Latest Week 8937;* Derwent Publications Ltd., London, AN 89-266598 & JP-A-1 192 536 (UBE Industries K.K.) Aug. 2, 1989.

Primary Examiner—Patrick J. Ryan
Assistant Examiner—Marie R. Macholl
Attorney, Agent, or Firm—Ostrolenk, Faber, Gerb & Soffen

[57] ABSTRACT

Film-based composite structures meet the requirements of highly weight-efficient SDI space-based systems. These structures are rigid, lightweight, dimensionally stable, and possess a high degree of structural damping. Thin-walled structures (wall thickness less than 50 $\mu$) made from self-reinforced ordered-polymer films overcome drawbacks of fiber-reinforced composites, and provide resistance to microcracking, ply delamination and impact. They have high temperature capability (over 300° C.), low temperature (cryogenic) capability and the capability for hardening and survivability. The modulus and dimensional stability of film-based ultralightweight honeycomb sandwich structures is better than currently possible with aluminum or fiber-reinforced composite materials. Other thin-walled structures such as tension web beams and thin facesheets also show similar stiffness-to-weight advantages over current materials.

33 Claims, 19 Drawing Sheets

POLY P-PHENYLENE BENZOBISTHIAZOLE (PBZT)

POLY-P-PHENYLENE BENZOBISOXAZOLE (PBO)

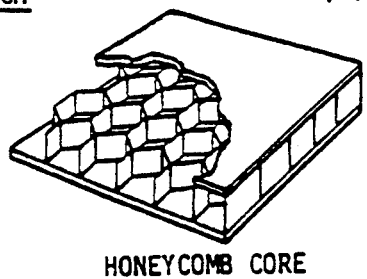
FIG. 5a SANDWICH
HONEYCOMB CORE
FIG. 5b
STIFFENED PANEL
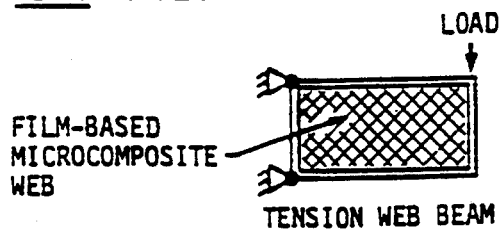
BEAMS FIG. 5c
FILM-BASED MICROCOMPOSITE WEB
LOAD
TENSION WEB BEAM
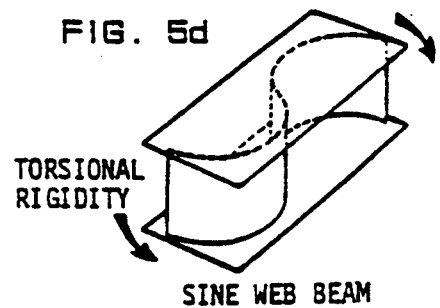
FIG. 5d
TORSIONAL RIGIDITY
SINE WEB BEAM
FIG. 5e
SQUARE TUBE, OPEN-FRAMED MODULE
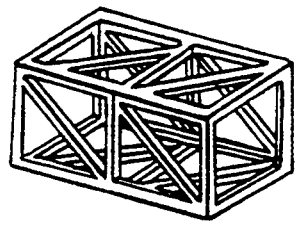
FIG. 5f
DIMPLE- AND FOLD-STIFFENED SKIN PANEL OF THERMOFORMED PBZT OR PBO MICROCOMPOSITE FILM
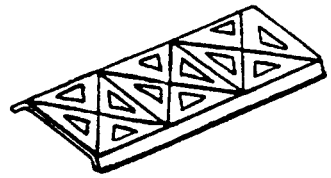
FIG. 5g
STIFFENED SKIN PANEL MODULE (BOX)
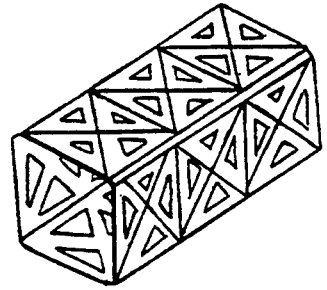

MIRROR-IMAGE SYMMETRY ABOUT THE MID-PLANE OF THE FILM THICKNESS

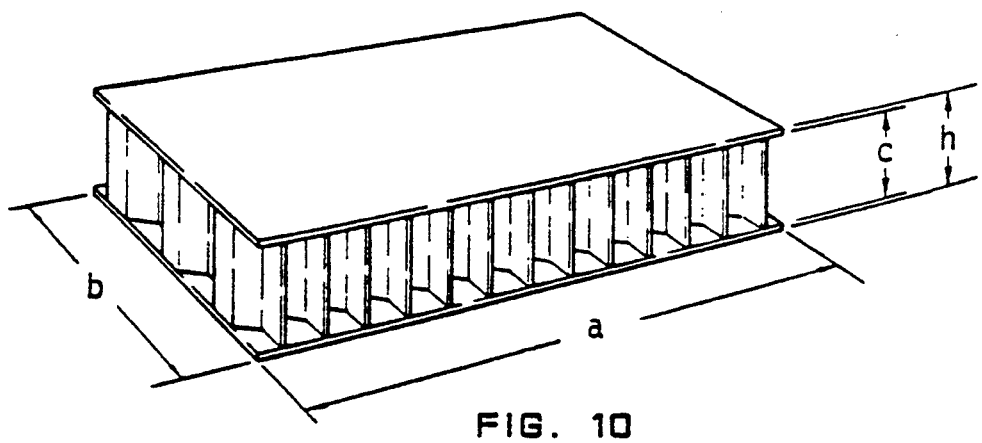
FIG. 10
FIG. 11
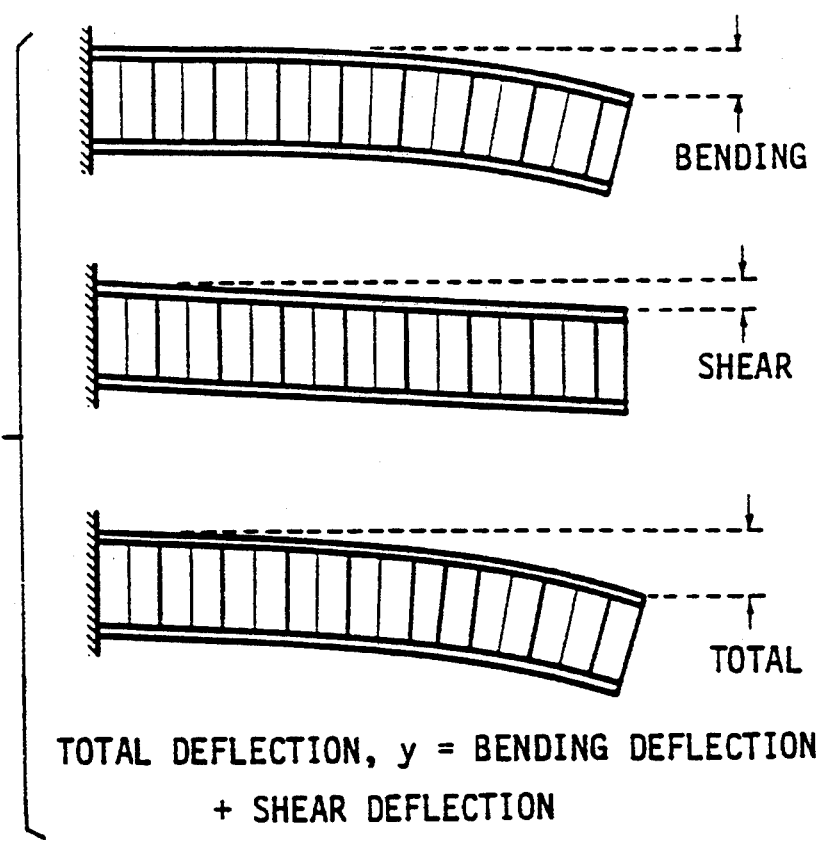
BENDING
SHEAR
TOTAL
TOTAL DEFLECTION, y = BENDING DEFLECTION
+ SHEAR DEFLECTION
FIG. 12
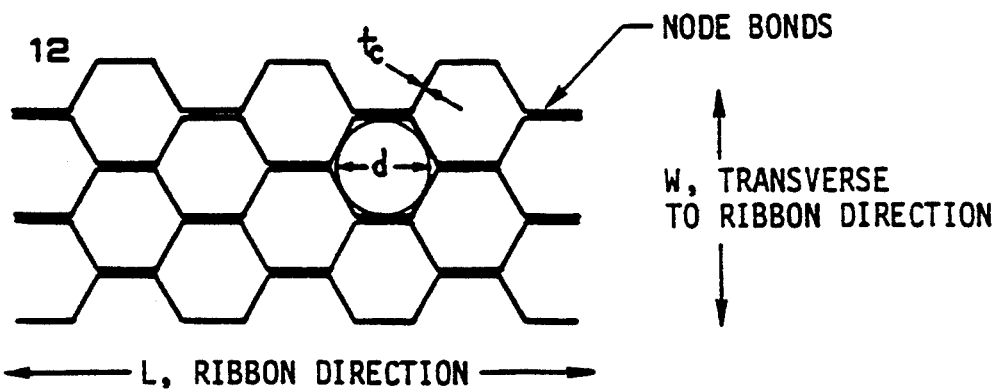
NODE BONDS
W, TRANSVERSE TO RIBBON DIRECTION
← L, RIBBON DIRECTION →

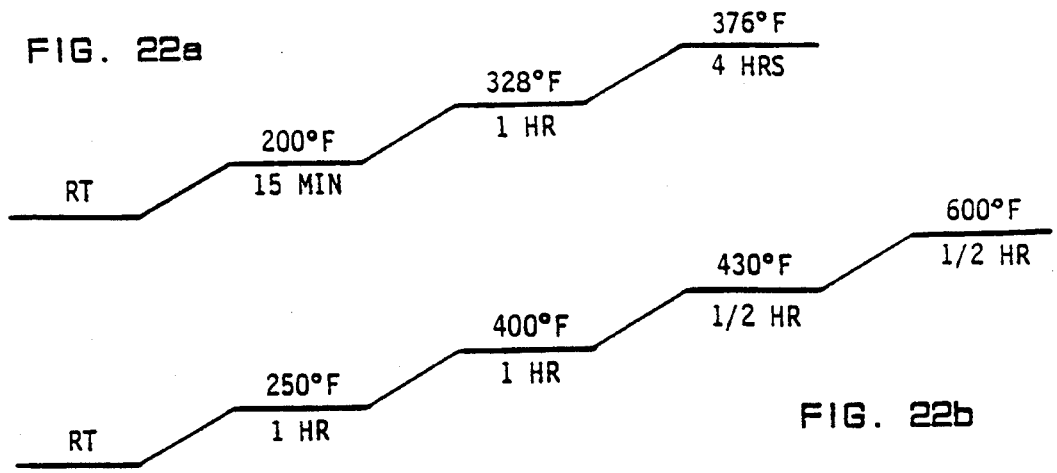
FIG. 22a
FIG. 22b
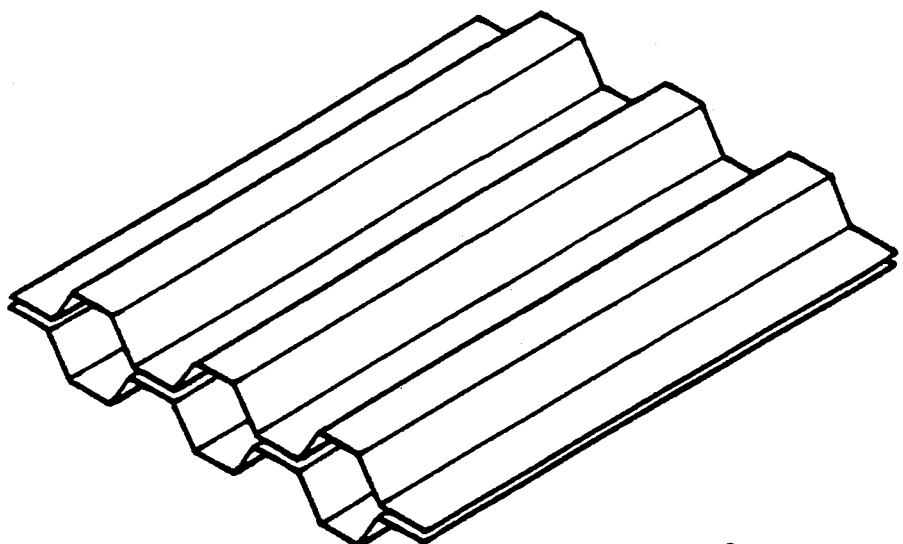
FIG. 23
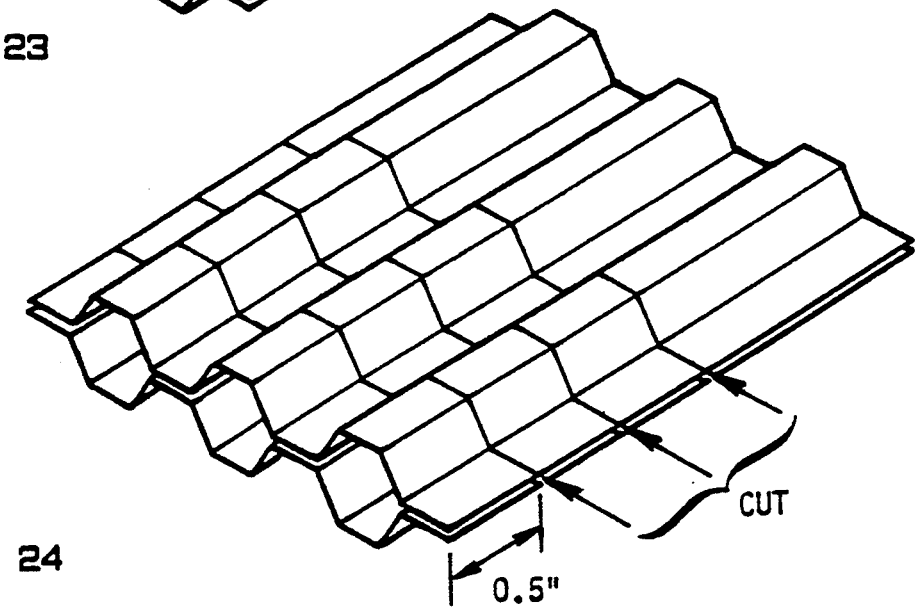
FIG. 24

HONEYCOMB CORE WITH SMOOTH, RETICULATED BONDING OF FACESHEET TO CORE WALL

HONEYCOMB CORE WITH UNEVEN BONDING OF FACESHEET TO CORE WALL

FILM-BASED COMPOSITE STRUCTURES FOR ULTRALIGHTWEIGHT SDI SYSTEMS

CROSS-REFERENCE TO RELATED APPLICATIONS

This application is a continuation-in-part of application Ser. No. 07/394,764, filed Aug. 08, 1989, now abandoned. This application is related to Ser. No. 07/365,847 filed Jun. 13, 1989, now U.S. Pat. No. 5,168,011 titled "Interpenetrated Polymer Fibers"; which is a division of Ser. No. 07/064,746 filed Jun. 22, 1987, now U.S. Pat. No. 4,845,150 issued Jul. 4, 1989 and titled "Interpenetrated Polymer Films"; which is a CIP of Ser. No. 06/780,648 filed Sep. 26, 1985 now abandoned.

It is also related to Ser. No. 98,710 filed Sep. 21, 1987 now U.S. Pat. No. 4,973,442; Ser. No. 203,329 filed Jun. 7, 1988 now U.S. Pat. No. 4,939,235; Ser. No. 206,137 filed Jun. 13, 1988 now U.S. Pat. No. 4,963,428 Ser. No. 07/206,484 filed Jun. 13, 1988, now U.S. Pat. No. 4,966,807 titled "Multiaxially Oriented Thermotropic Polymer Films and Method of Preparation"; Ser. No. 209,271 filed Jun. 20, 1988 now abandoned; Ser. No. 07/209,281 filed Jun. 20, 1988 now U.S. Pat. No. 4,975,312, filed "Multiaxially Oriented Thermotropic Polymer Substrate for printed Wire Boards"; and Ser. No. 367,433 filed Jun. 16, 1989 now abandoned.

Also of interest are U.S. Pat. Nos. 4,533,692; 4,533,693; and 4,533,724, all to Wolfe et al.

The disclosures of these applications and all other cited prior art materials are incorporated herein by reference.

BACKGROUND OF THE INVENTION

1. Brief Description of the Invention

The present invention relates to a new class of structural materials, having the near-zero coefficient of thermal expansion (CTE) and high stiffness-to-weight ratio required for space-based Strategic Defence Initiative (SDI) systems. These structures have a CTE of less than 1 ppm/°C., preferably less than 0.3 ppm/°C., and have a specific stiffness more than twice that possible with aluminum.

In addition, they have high- and low-temperature capability (−50° to 150° C.), impact resistance, high structural damping, and survivability to a variety of mission-specific threats.

Metallic structures are heavy, and conventionally designed structures made from fiber-reinforced composites cannot meet all the demands placed on space-based systems without severe weight penalties, high cost, and slow fabrication. Microcomposite structures made from self-reinforced ordered polymer films, and possibly secondary materials, have excellent intrinsic and tailorable properties to fulfill ultralightweight SDI structural design requirements and the need for rapid fabrication.

Poly-p-phenylene benzobisthiazole (PBZT) and poly-p-phenylene benzobisoxazole (PBO) are liquid-crystalline ordered-polymer materials with specific strength and stiffness, CTE, and Other mechanical properties equal to or better than many fiber-reinforced composites. Ordered polymers in thin-film form (0.2 to 2 mils) become highly efficient microcomposites when impregnated with secondary material (epoxy, sol-gel, polyimide).

As described in Section 2, the excellent properties exhibited by thin-film PBZT can be translated into a new class of thin-walled structures which includes stiff, ultralightweight structures (ULWS) for space-based SDI systems. We have demonstrated that a PBZT honeycomb sandwich structure can achieve near-zero CTE (at least as low as 0.3 ppm/°C.) and high specific stiffness, with potential weight savings of 40 to 50 percent over graphite fiber composites, for applications requiring dimensional control of space-based SDI platforms.

The ULW sandwich structure with a specific shear stiffness of the core greater than $34 \times 10^6$ in. ($863 \times 10^3$ m), about 30 percent better than aluminum, was designed and fabricated with thin (less than 0.002 in., 0.05 mm), biaxially-oriented PBZT film. In addition, near-zero CTE was achieved through a temperature range of −50° C. to +150° C. Tables 1—1 and 1-2 as well as FIG. 1 compare these properties to current state-of-the-art graphite fiber reinforced cores as well as commercially available cores. This particular PBZT structure has potential applications especially where minimum deflection and dimensional stability during thermal cycling in space is critical.

The advantage of using thin, high-modulus PBZT films is illustrated in FIG. 2 for several core materials. Current quasi-isotropic graphite-reinforced composite materials show high specific stiffness but are limited by their thickness. For the same shear modulus and core thickness, weight savings of nearly 38 percent can be achieved by using PBZT as the core material instead of the thickness-limited graphite/epoxy material. Further reduction in wall thickness is possible by reducing the amount of adhesives, for example, and should bring weight savings to 50 percent or more.

These structures have both extremely high flexural stiffness, at least 70,000 psi, combined with extremely low core density, no more than 5 pcf, preferably no more than 3 pcf. The high flexural stiffness arises from the inherent stiffness of the films employed, which can be made thin and accordingly are usable with a cell size of ⅛-inch or preferably less, as well as from the stiffness of the facesheets, which can be made from the same material as the core.

The weight savings realized by applying the ultralightweight PBZT core to SDI space-based applications allows significant performance improvements in sandwich structures. For example, thicker facesheets and larger facesheets separation distances are possible without any increase in weight over the baseline graphite honeycomb core sandwich to improve tracking accuracy and dimensional stability. Also, thin-films permit smaller cell sizes (less than 0.15 in.) without any increase in core weight. This reduces facesheet wrinkling and allows for thinner facesheets for antenna and mirror applications.

2. Background of Ordered-Polymer Films

This section will give an overview of the ordered-polymer films which are of great interest in connection with this invention. Current graphite/epoxy (Gr/Ep) or thermoplastic (TP) composites have high specific stiffness properties but cannot be processed economically as an ultrathin gage (less than 0.010 in., 0.25 mm) structural material. Thin-film PBZT can achieve the high specific stiffness required of SDI space-based designs as ultrathin, biaxially-oriented film. The ability to tailor properties such as stiffness, strength, CTE, and toughness are also important for optimizing such structural designs. Emphasis, then, is placed on applying thin-film PBZT to generic structures that require a maximum stiffness-to-weight ratio.

2.1 Development of Film-Based Ordered Polymers

The assignee of the present invention, Foster-Miller, Inc., has developed film-processing techniques for producing biaxially-oriented ordered polymer films from lyotropic solutions of high-viscosity aromatic heterocyclic polymers. See Ser. No. 07/098,710. FIGS. 3(a) and 3(b) show two such rigid-rod polymers, poly-p-phenylene benzobisthiazole (PBZT) and poly-p-phenylene benzobisoxazole (PBO). The presence of aromatic groups and ring-shaped stiffening elements (heterocyclic rings containing nitrogen and sulfur) in the backbone of the polymer molecule give rise to its excellent mechanical properties as well as high thermo-oxidative resistance. In addition to film processing, Foster-Miller has developed novel solution processing and treatment to control orientation, microfibrillar structure and texture, and physical properties. See Ser. Nos. 07/098,710 and 07/064,746.

Generally, the structural materials of the present invention contain polybenzazole (PBZ) polymers selected from the group consisting of polybenzoxazole (PBO), polybenzothiazole (PBT) and polybenzimidazole (PBI) polymers, and random, sequential or block copolymers thereof. Polybenzazole polymers and their synthesis are described at length in numerous references, such as Wolfe et al., Liquid Crystalline Polymer Compositions, Process and Products, U.S. Pat. No. 4,533,693 issued Aug. 6, 1985, and W.W. Adams et al., *The Materials Science add Engineering of Rigid-Rod Polymers* (Materials Research Society 1989), which are incorporated herein by reference.

Polybenzazole polymers preferably contain a plurality of met units that are AB-PBZ met units, as represented in Formula 1(a), and/or AA/BB-PBZ met units, as represented in Formula 1(b)

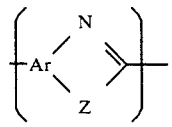

1(a) AB-PBZ

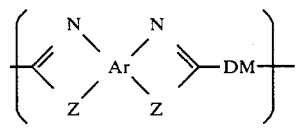

1(b) AA/BB-PBZ wherein:

Each AR represents an aromatic group. The aromatic group may be heterocyclic, such as a pyridinylene group, but it is preferably carbocyclic. The aromatic group may be a fused or unfused polycyclic system. The aromatic group preferably contains no more than about three six-membered rings, more preferably contains no more than about two six-membered rings and most preferably consists essentially of a single six-membered ring. Examples of suitable aromatic groups include phenylene moieties, biphenylene moieties and bisphenylene ether moieties. Each Ar is most preferably a 1,2,4,5-phenylene moiety.

Each Z is independently an oxygen atom, a sulfur atom or a nitrogen atom bonded to an alkyl group or a hydrogen atom. Each Z is preferably oxygen or sulfur (the polymer is preferably PBO, PBT or a copolymer thereof);

Each DM is independently a bond or a divalent organic moiety that does not interfere with the synthesis, fabrication or use of the polymer. The divalent organic moiety may contain an aliphatic group (preferably $C_1$ to $C_{12}$), but the divalent organic moiety is preferably an aromatic group (At) as previously described. Each DM is preferably a 1,4-phenylene moiety or a 4,4'-biphenylene moiety, and is most preferably a 1,4-phenylene moiety.

The nitrogen atom and the Z moiety in each azole ring are bonded to adjacent carbon atoms in the aromatic group, such that a five-membered azole ring fused with the aromatic group is formed.

The azole rings in AA/BB-PBZ met units may be in cis- or trans-position with respect to each other, as illustrated in polybenzothiazoles and Polybenzoxazoles, 11 Ency. Poly. Sci. and Eng. 601, 602 (J. Wiley & Sons 1988), which is incorporated herein by reference.

The polybenzazole polymer may be rigid rod, semirigid rod or flexible coil. It is preferably rigid rod in the case of an AA/BB-PBZ polymer or semirigid in the case of an AB-PBZ polymer. It more preferably consists essentially of AA/BB-PBZ met units. Exemplary highly preferred met units are illustrated in Formulae 2 (a)-(e).

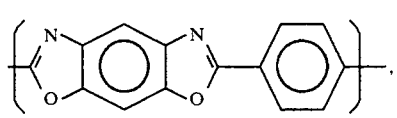
(a)

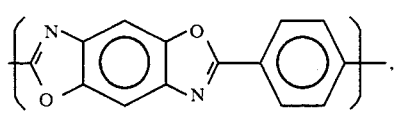
(b)

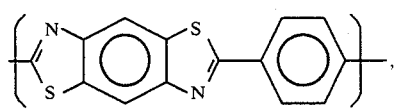
(c)

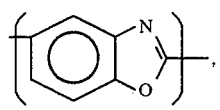
(d)

and

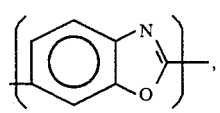
(e)

The polybenzazole polymer most preferably consists essentially either of the met units illustrated in Formula 2(a) (cis-PBO) or of the met units illustrated in Formula 2(c) (trans-PBT), Each polymer preferably contains on average at least about 25 mer units, more preferably at least about 50 mer units and most preferably at least about 100 mer units, The intrinsic viscosity of cis-PBO or trans-PBT in methanesulfonic acid at 25° C. is preferably at least about 10 dL/g, more preferably at least about 20 dL/g and most preferably at least about 30 dL/g.

The examples herein relate mainly to PBZT structures, but PBO is also usable as it is often interchangeable with PBZT. PBO is commercially available from the Dow Chemical Company. U.S. Pat. Nos. 4,772,678; 4,703,103; 4,533,724; 4,533,692; 4,225,700; 4,131,748; and 4,108,835 are of interest in connection with the manufacture of PBO and PBZT.

Also usable are thermotropic polymers, including wholly aromatic polyesters such as Vectra (trademark), which is available from Hoechst-Celanese, and is a naphthalene-based aromatic copolyester; or Xydar (trademark), which is available from Amoco Performance Polymers, and is a bisphenol-based aromatic copolyester.

Biaxially-oriented PBZT films exhibit properties of high strength and stiffness (as high as 280 Ksi (1.72 GPa) tensile strength, and 25 Msi (172 GPa) tensile modulus). They have controllable CTE (from $-10°$ to $+20°$ ppm/°C.), and outstanding thermal-oxidative resistance of over 400° C. PBO is believed to have even higher specific modulus than PBZT, based on preliminary data from Dow Chemical on their PBO fibers. The control over properties and characteristics of PBZT films as thin as 0.0015 in. (0.04 mm) is accomplished through engineering at a microcomposite level of about 10 to 100 times smaller than fibers or fabrics; resulting in high-performance, ultrathin structures. Orientation can vary from highly uniaxial ($\pm 10$ deg.) to quasi-isotropic ($\pm 45$ deg.), depending on the performance requirements of the SDI space-based structures. Table 2-1, listing the properties of PBO and PBZT film along with graphite/epoxy unidirectional composite, reflects the outstanding specific stiffness (modulus divided by density) of these ultrathin, ordered-polymer films.

The rod-like morphology of PBZT films is the key to both their excellent properties and their ability to be engineered into ultrathin composites and laminates. The rigid-rod molecules in the form of biaxially-extruded film consist of an interconnected microfibrillar network, similar to unidirectional plies stacked together as a single film, as shown schematically in FIGS. 4(a) and 4(b). The dimensions of this polymer network are on the order of 50 to 100 Å in size, and during processing it can be infiltrated by a secondary material such as a dissolved or uncured polymer, or can be completely consolidated into 100% PBZT or PBO. The secondary or matrix material, if used, encapsulates the PBZT microfibrils and acts concert with the network to form a microcomposite having volume percentages of 5% to 70% secondary material, for example. See also Ser. No. 07/064,746, regarding these microcomposites. These microcomposites are known as "prepregs" in that the polymer network is pre-impregnated with the matrix material.

The properties of the PBZT microcomposite are tailorable, depending on the matrix material used. See Ser. No. 07/064,746. Efforts conducted at Foster-Miller have shown that a variety of matrix materials can form different types of microcomposites, including polyimide, epoxy and silica glass processed by the sol-gel method. The impregnation process can also be used to bond adjacent PBZT/matrix plies together to build up a laminate with quasi-isotropic properties. A thin coating of high-temperature resins, such as polyimide on the surface of the PBZT film, can serve as adherent for bonding PBZT film. This is useful for node bonds in honeycomb cores or joints on stiffened panels.

2.2 Application of Ordered Polymer Films to Ultralightweight Structures

One of the major advantages of using film-based PBZT for structural application is the film's ability to achieve high specific stiffness at a thickness of less than 0.002 in. (0.05 mm). Thin-walled structures such as tubes, ribbed panels and honeycomb sandwich structures fail at the elastic buckling stress of the structure (also called shell buckling). This buckling stress is directly related to the modulus and in general is much lower than the material's compressive stress. Thus, high-modulus, low-density thin materials such as PBZT films are required for space-based satellite structures.

When using an isotropically balanced eight-ply composite laminate for SDI structures, ultrathin plies are needed for high-stiffness, moderate-strength, minimum-gage applications, with a minimum gage being 0.040 in. (1.0 mm). However, future requirements for space structures will call for a gage of less than 0.010 in. (0.25 mm) for similarly balanced six- or eight-ply laminates (1). Production costs are extremely high for these fiber-reinforced sheets because it is difficult to spread and handle high modulus tows or yarns. PBZT films have the ability to exceed specific stiffness of $3.2 \times 10^8$ in. as an ultrathin, quasi-isotropic material that is eight times thinner (less than 0.005 in., 0.127 mm) than current graphite-fiber prepregs. This will permit thin, dimensionally stable, high-stiffness structures to be fabricated.

High strength and high modulus carbon-fiber-reinforced composites (epoxy and thermoplastics) will play important roles in SDI space-based systems, but innovative new designs will also be needed. Some of these new structures are shown in FIGS. 5(a)–5(g).

Emphasis of SDI requirements for space-based systems has shifted from space-based interceptors (SBI) to space surveillance and tracking system (SSTS). These large, boxlike structures and platforms must be of low mass and high dimensional stability. New innovative structural designs can be realized only by using high modulus, thin-film PBZT as the primary structural material. Metals are too heavy and fiber composites are too thick.

In Section 3, we describe the design and fabrication of a thin-walled, ultralightweight honeycomb core using PBZT as the core material. The core provides high shear stiffness (98 Ksi at 5 pcf core density) and low CTE (0.3 ppm/°C.) to meet the requirements of space surveillance and tracking systems. Furthermore, ULW PBZT honeycomb sandwich structures have the potential for producibility at an affordable rate, since films can be produced more rapidly than thin fiber-reinforced/epoxy prepregs.

BRIEF DESCRIPTION OF THE DRAWINGS

FIGS. 5(a)–5(g) show several innovative designs for thin-walled, ultralightweight structures.

FIG. 10 shows a honeycomb core sandwich.

FIG. 11 shows the respective contribution of bending and shear to total deflection.

FIG. 12 shows the nomenclature for hexagonal core.

FIGS. 22(a) and 22(b) are thermoform schedules for (a) PBZT/Tactix 695 and (b) PBZT/PMR-15, respectively.

FIG. 23 is a perspective view of a primary bonded single layer hexagonal sheet.

FIG. 24 is a perspective view showing a single layer honeycomb cut into sections prior to stacking into full core.

DETAILED DESCRIPTION OF A PREFERRED EMBODIMENT

3. Thin-Walled ULW Honeycomb Core

Foster-Miller has developed novel film processing techniques for lyotropic ordered polymers. Properties of biaxially extruded PBZT films show promise as thin, high-modulus structural material. To realize this potential, an ultralightweight thin-walled honeycomb sandwich was designed, fabricated, and tested. Section 3, et seq. gives an overview for predicting elastic properties of biaxially-oriented PBZT film. Using the results of this theory, a design analysis for the honeycomb core was conducted. Section 3.2 et seq. describes the technology developed for fabricating the stiff honeycomb sandwich cores as well as for testing the core's stiffness properties.

3.1 Design Analysis Of PBZT Honeycomb Core

The design of the thin-walled structure takes advantage of PBZT's tailorable properties. Biaxially-oriented films are engineered at the molecular level to optimize a given structural design. Requirements such as high specific stiffness greater than $10^8$ in., low mass, and near-zero CTE are met by integrating specific properties of thin-film PBZT into the design of stiffened and dimpled panels, honeycomb sandwiches, tension-web beams, thin-walled tubes, and struts.

3.1.1 Micromechanics of Biaxially-Oriented Thin Film PBZT

One of the objectives of our invention is to apply a micromechanical model to biaxially-oriented thin film PBZT so that in-plane stiffness properties can be determined. The model is based on classical laminated plate theory (2) as applied to orthotropic laminates and shows good agreement with the experimental data. In subsection 3.1.2, we will see how the elastic constants obtained through this analysis are used to design a honeycomb sandwich structure.

Figure 6:
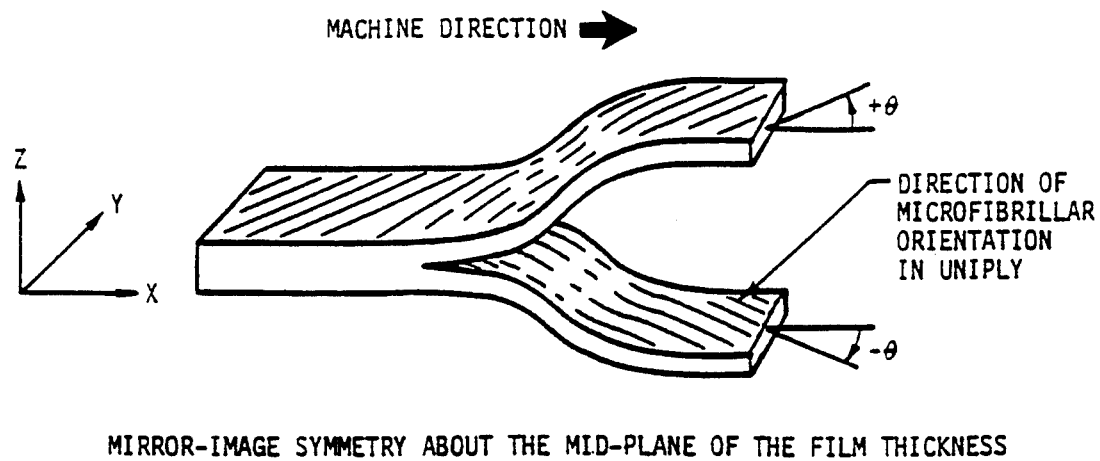
FIG. 6 shows the biaxial in-plane orientation of PBZT film.

FIG. 6 shows how PBZT film as extruded by Foster-Miller's counter-rotating tube die exhibits a biaxial in-plane orientation. See Ser. No. 07/098,710. This allows us to tailor the stiffness and CTE properties by molecular orientation of the rigid-rod like polymers in these films. A generalized model based on previous studies (3) at Foster-Miller was developed with a two-ply laminate model to predict stiffness properties as a function of the orientation angle, $\Theta$.

Figure 7:
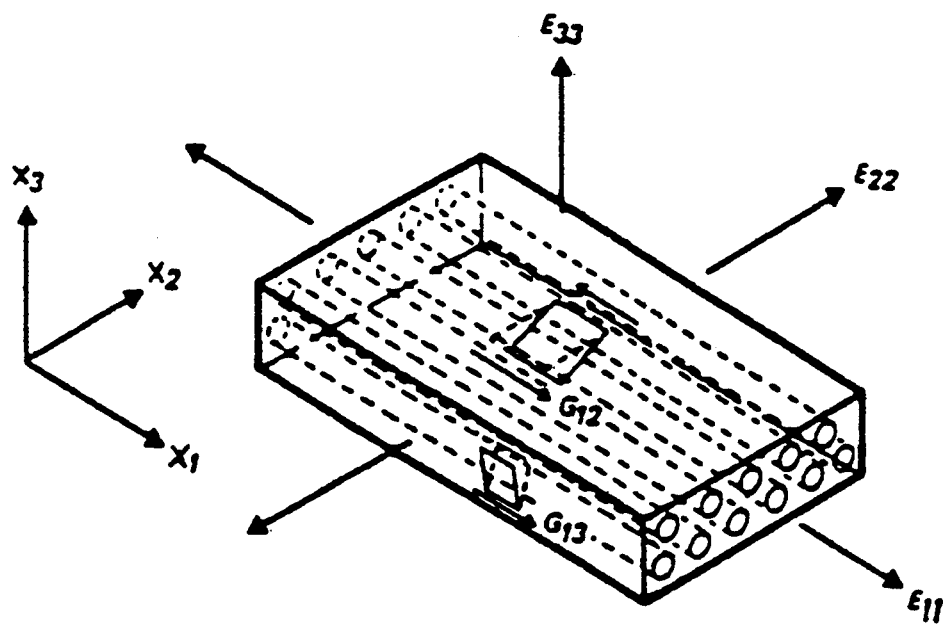
FIG. 7 shows the elastic properties of a composite material as referred to Cartesian coordinates (5).

Single-layer biaxially-oriented PBZT film is modeled as two hypothetical unidirectional plies (uniplies) oriented in the $\pm\theta$ directions. The uniplies are highly oriented due to the rod-like nature of PBZT molecules, and can be modelled using the nomenclature of FIG. 7. The following assumptions are made: (3)

Each uniply undergoes the same in-plane strains. That is, each uniply is coupled or bonded to the layers above and below so that there is no relative slip. The interlaminar shear forces required to produce the same strain in each uniply are transferred from layer to layer. It has been reported (3) that the experimental data for in-plane modulus indicate that this assumption is at least a good approximation.

Each uniply can be characterized as homogeneous and two-dimensionally orthotropic with respect to the four elastic constants used to characterize each lamina ($E_{11}$, $E_{22}$, $G_{12}$, and $\nu_{12}$). Thus, the biaxially-oriented film is modelled as consisting of two uniplies oriented at $+\Theta$ and $-\Theta$ to the machine direction (MD), or longitudinal axis of the film, as shown in FIG. 6.

The film is assumed to be balanced, that is, 50 percent of the material is oriented at $+\Theta$ and 50 percent at $-\Theta$.

The films are sufficiently thin so that any antisymmetry about the midplane is negligible. The out-of-plane moments and curvatures created by such antisymmetry are taken as sufficiently small so that they do not affect the calculation of in-plane strains.

Figure 9:
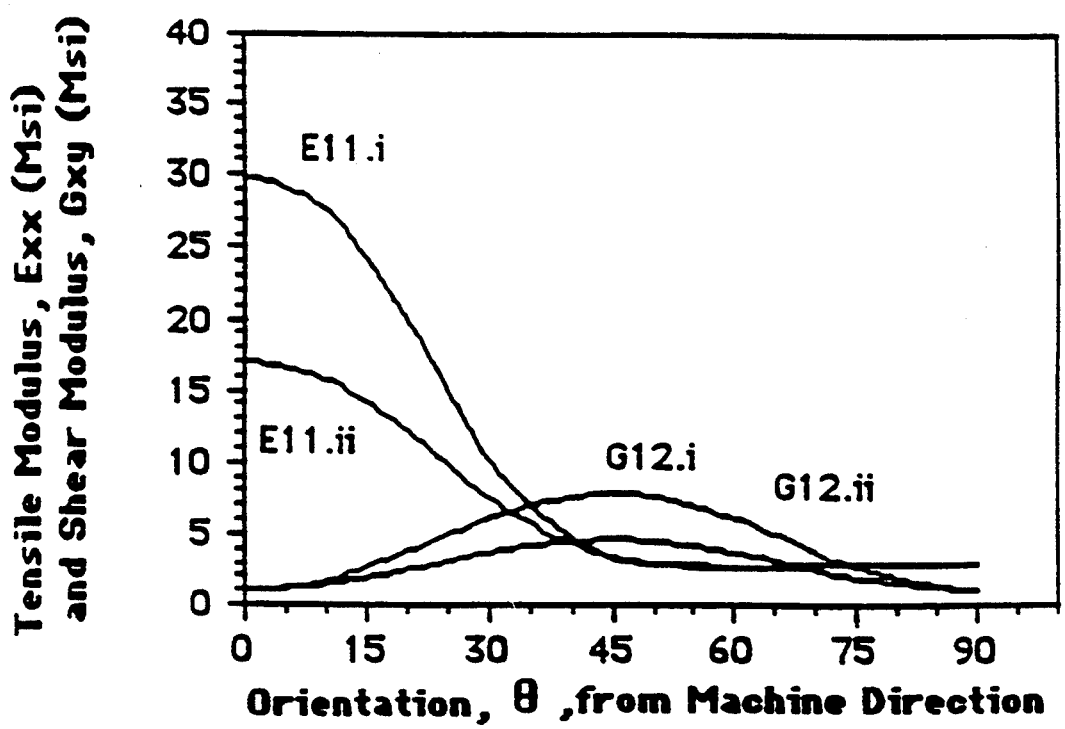
FIG. 9 is a plot of $E_{xx}$ and $G_{xy}$ for biaxially-oriented PBZT film.

The intent of this analysis is to determine the four independent elastic constants and the orientation angle, $\Theta$, required to characterize the biaxially-oriented PBZT film. The parameters to be determined are:

$E_{11}$ = longitudinal Young's modulus
$E_{22}$ = transverse Young's modulus
$E_{66} = G_{12}$ = transverse shear modulus
$\nu_{12}$ = major Poisson's ratio
$\Theta$ = orientation angle of the film Table 3-1 presents the calculated parameters for biaxially-oriented film based on two cases of elastic constants for the uniply model. FIG. 9 shows the results in graphical form for $E_x$ and $E_y$. Case i is the predicted values using high tensile modulus for the PBZT uniply, $E_{11} = 30$ Msi. The curve of case ii is for $E_{11} = 17$ Msi. Both sets of data were computed by an iterative method which will be outlined in Sections 3.1.1 (A.1) and 3.1.1 (A.2). Since the shear modulus, $G_{xy}$, is difficult to determine experimentally, laminated plate theory was applied using known (or estimated) constants, $E_x$ and $E_y$, as $\nu_{xy}$.

Figure 8:
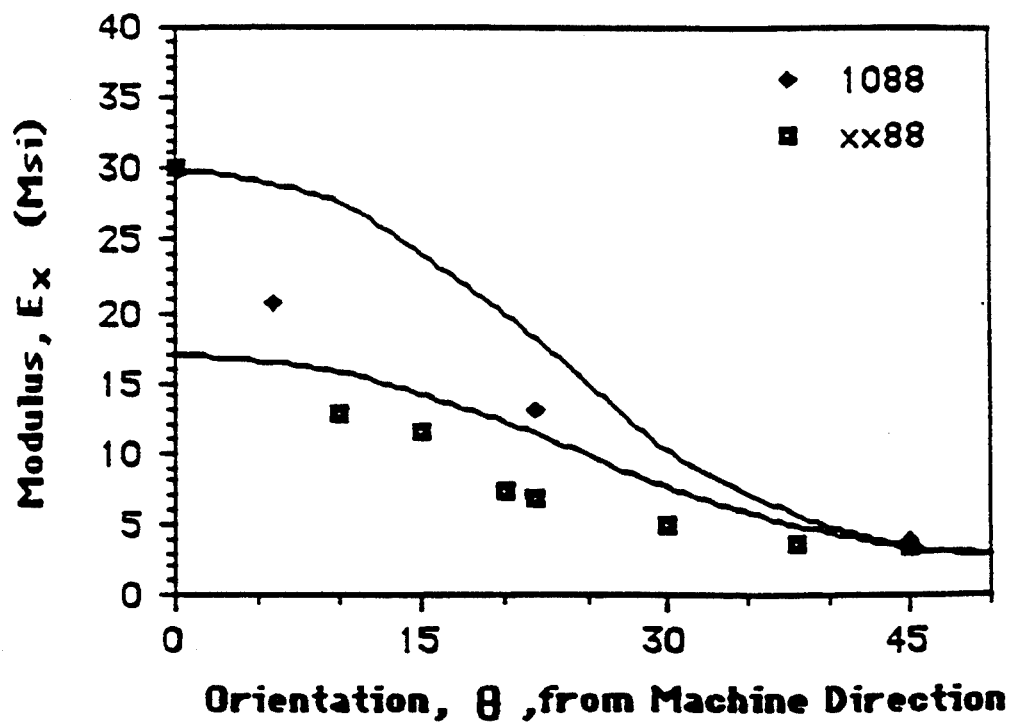
FIG. 8 shows modulus as a function of orientation angle, $\Theta$, for PBZT film, experimental.

In reference to FIG. 8, one trend is to be noted. The decrease in modulus from $\theta = 10$ deg. to $\theta = 45$ deg. is due to the reduction in the microfibrils' contribution to stiffness with increasing off-axis angle, $\theta$. Later, we will see how shear modulus $G_{12}$ increases as e goes from $\theta = 0$ deg. to a maximum of $\theta = 45$ deg. This becomes an important criterion in designing a honeycomb core with high shear stiffness.

FIG. 8 shows the comparison of the calculated modulus values with measurements. The data labelled 1088 are for the neat PBZT film used in this invention. Data labelled xx88 are film runs conducted prior to the 1088 run. Axial tensile moduli, $E_x$, of biaxially-oriented PBZT thin films have been measured at Foster-Miller.

Data computed from laminated plate theory is found to fit the experimental data closely from $\theta = 10$ deg. to $\theta = 45$ deg. Stiffness properties of the PBZT film as predicted by our model can be used for optimal design of ultralightweight structures for systems. High stiffness, near-zero CTE, and low weight can be achieved by proper selection of biaxially-oriented PBZT film. A PBZT honeycomb core was designed, fabricated and evaluated against aluminum and graphite honeycomb cores for application to ultralightweight sandwich structures.

3.1.1(A.1) Determination of In-Plane Shear Modulus by an Iterative Procedure

The in-plane shear modulus, $G_{12}$, was calculated by an iterative method. The test method developed by Rose (12) (adopted as ASTM standard D3518-76/1982) allows us to compute $G_{xy}$ using tensile-strain data for $\pm 45$ deg. biaxially-oriented PBZT film. The film is modeled as a $\pm 45$ deg. laminate so that GENLAM, a software using laminated plate theory, can compute off-axis properties for a given input of four elastic constants.

Equation A-1 presents shear modulus, $G_{xy}$, as a function of two other elastic constants, $E_x$ (longitudinal tensile modulus), and Poisson's ratio, $\nu_{xy}$. Although this relationship holds true only for isotropic materials (properties the same in all directions), the in-plane stress-strain response of a $\pm 45$ deg. uniply PBZT laminate, as a quasi-isotropic material ($E_x = E_y$ and $\nu_{xy} = \nu_{xy}$), can be considered to be isotropic. This allows $G_{xy}$ in Equation A-1 to be computed from experimentally determined values of $E_x$ for $\pm 45$ deg. biaxially-oriented PBZT film. $G_{xy}$ can be determined by comparing the estimated values of $\nu_{xy}^c$ to those of $\nu_{xy}^s$ predicted by laminated plate theory until they converge. The general procedure for iteration consists of first creating a ($\pm 45$ deg.) s laminate in GENLAM and using known values of $E_x$, $E_y$. An initial value of $G_{xy}$ is calculated from Equation A-1 using $\nu_{xy}^s = 0.5$. The steps include:

1. Create ($\pm 45$ deg.) s laminate using GENLAM and note calculated value of $\nu_{xy}^c$ at $\theta = 45$.

2. If $\nu_{xy}c$ is not equal to $\nu_{xy}s$ (as calculated for $\theta = 45$ deg.), then find mean value of $\nu_{xy}c$ and $\nu_{xy}s$ and calculate value of $G_{xy}t$:

$$G_{xy}\,t = \frac{E_x}{1 + \nu_{xy}c} \quad (A\text{-}1)$$

3. Create a new ($\pm 45$ deg.) s laminate using $G_{xy}^t$ and note new value of $\nu_{xy}c$ as $\nu_{xy}s$.

4. If $\nu_{xy}c = \nu_{xy}s$, then iteration is completed and $G_{xy}$ determined. Otherwise repeat Steps 2 and 3 setting $\nu_{xy}s$ as $\nu_{xy}c$ until Step 4 is satisfied. Note that when $\nu_{xy}^c = \nu_{xy}^s$, the computed value of $E_x$ will be the same as the experimentally determined value of $E_x$. This proves the validity of this iterative method.

3.1.1 (A.2) Two Case Studies of Elastic Constants of PBZT Film

Figure 3A:
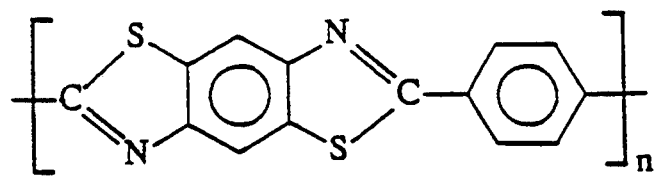
FIGS. 3(a) and 3(b) respectively show the chemical structure of two lyotropic liquid crystal polymers, PBZT and PBO.
Figure 3B:
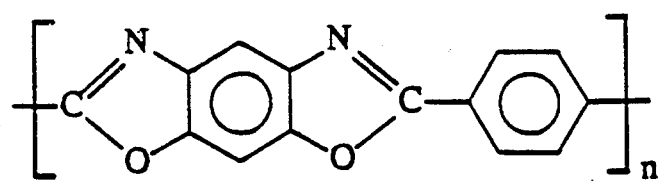
Figure 4A:
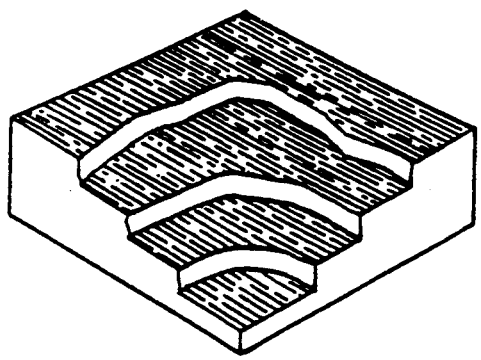
FIGS. 4(a) and 4(b) are a schematic diagram showing orientation of single layer PBZT films.
Figure 4B:
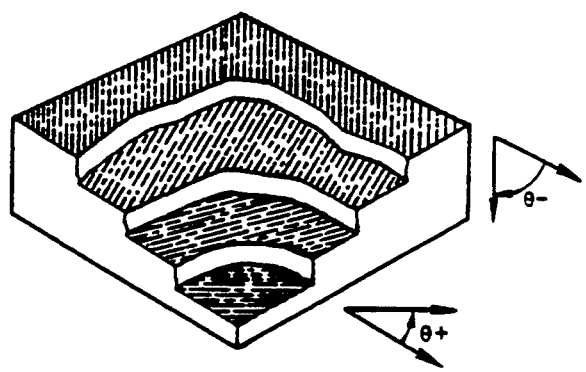

A parametric study involving effects of varying $E_{11}$, $E_{22}$, $G_{12}$ and $\nu_{12}$ for $E_x$ as a function of orientation, $\theta$, was conducted using laminated plate theory. Since the data plotted as FIG. 3-4 exhibit variation in modulus values for a given orientation, curves for two case studies were generated using the GENLAM software. These curves established a "range" for the data points. In both cases, $E_y$ was taken as 3.0 Msi and Poisson's ratio of 0.3 was used. For each case, a new value of $G_{12}$ was determined using the iterative procedure outlined previously in Section 3.1.1 (A.1).

The data generated from GENLAM software is tabulated in subsection 3.1 as Table 3-1. Initial conditions for case i and ii are found as $E_{11}$, $E_{22}$, $G_{12}$ and $\nu_{12}$ at $\theta = 0$ deg..

3.1.2 PBZT Honeycomb Core as an ULW Structure

Figure 1:
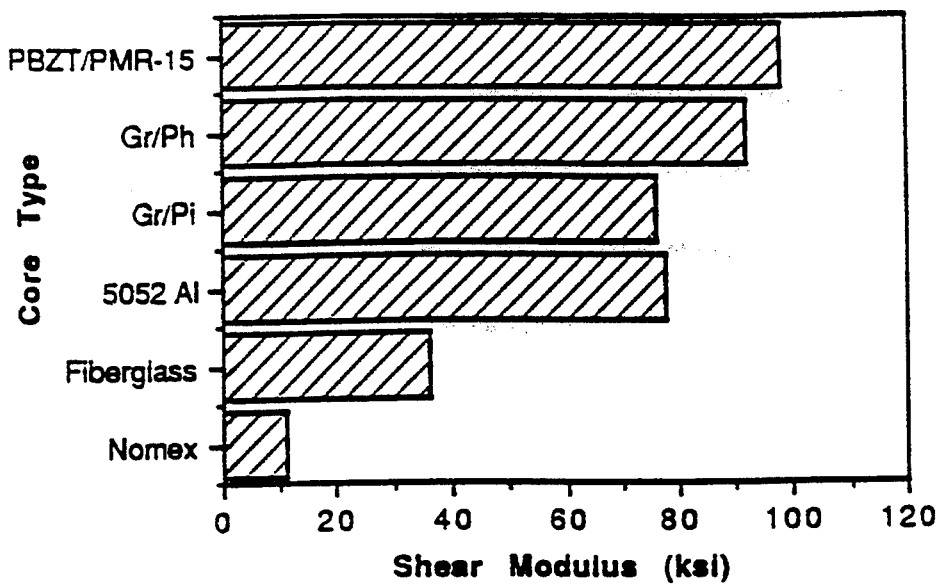
FIG. 1 is a bar graph reflecting outstanding shear modulus of PMR-15/PBZT honeycomb core as compared to current cores of 5.0 pcf density.
Figure 2:
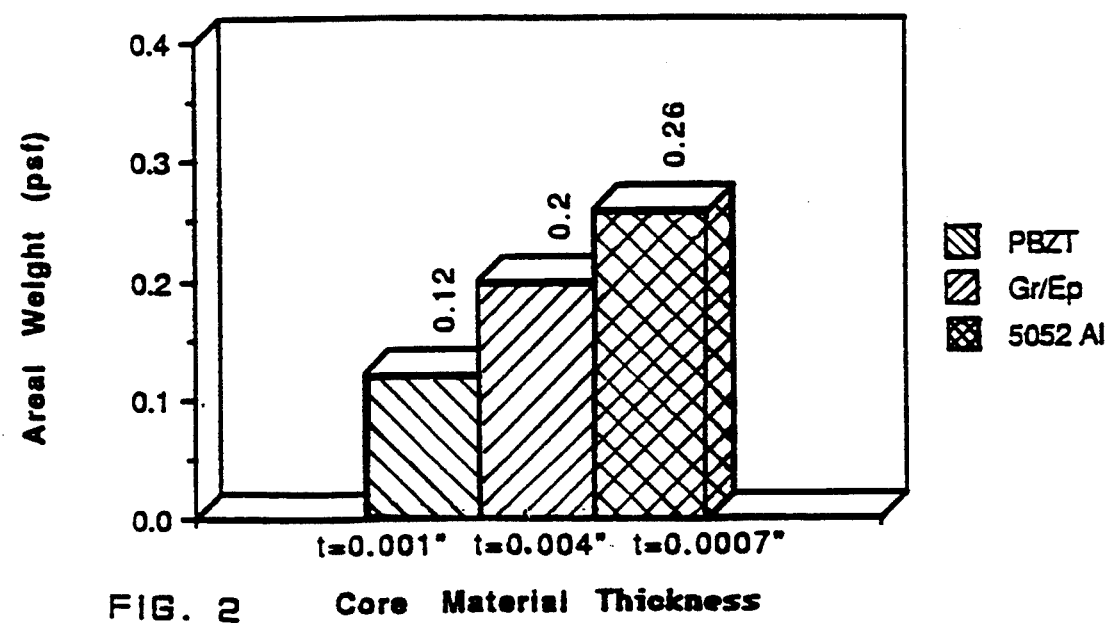
FIG. 2 is a bar graph showing minimum weight required for effective transverse shear modulus of 70 Ksi for several honeycomb cores. Note that PBZT and Gr/Ep core materials have $\pm 45$ deg. biaxial orientation.

We have demonstrated that the ultrathin, biaxially-oriented PBZT film produces honeycomb cores superior to the current state-of-the-art graphite honeycomb core. For instance, the PBZT honeycomb core with the same shear stiffness as a graphite core is 34 percent lighter: or in the same case of honeycomb cores with the same areal densities, the PBZT core possesses 33 percent higher shear stiffness, as shown previously in FIG. 1. With improved quality film and better fabrication techniques, weight savings of 40 to 50 percent over current graphite/epoxy cores are obtained. This weight savings, as previously shown in FIG. 1-3, allow significant performance improvements for SDI space-based applications. For example, thicker facesheets and/or larger facesheet separation distance is possible, without any increase in weight over the baseline graphite honeycomb core sandwich, to enhance the structural and system performance, e.g., tracking accuracy, dimensional stability, low moment of inertia, low mass, etc. Also, cell size can be reduced without any increase in weight, using thinner walls. This reduces facesheet thickness for precision surfaces such as optical platforms, mirrors and microwave antennae.

The design of an ultralightweight honeycomb core is especially adapted to space-based applications. In addition to general requirements of high stiffness-to-weight ratio and dimensional stability, the ULW honeycomb sandwich must have:

A core of high shear stiffness at minimum possible weight. This minimizes deflections and allows for high natural frequency of vibration.

Thin-walled core is necessary to allow for small cell size (less than 0.125 in.). Facesheet dimpling and wrinkling are reduced, permitting use of thinner facesheet materials. This allows the honeycomb core to provide a stable and stiff support for precision optical tracking and surveillance systems.

High damping and stiffness is necessary to attenuate vibration caused by platform maneuvering or ejection of interceptors. This is difficult to obtain as very few structural materials have adequate passive inherent damping characteristics (1).

Compressive (flatwise) strength and compressive modulus are secondary considerations. The core needs to withstand the application of the facesheet during fabrication. The platform will experience severe loads only during launch acceleration (10 to 15 g's).

Potential for rapid fabrication and relatively low materials cost. The large number of structures to be deployed as part of the SDX space architecture creates a need for producibility and affordability never before experienced in space hardware production (1).

To achieve high shear modulus, ±45 deg. orientation of the PBZT core is preferred, based on the results summarized in FIG. 8. In the following design analysis, the ±45 deg. biaxially-oriented PBZT film is compared to a ±45 deg.-bias weave T-300 graphite/epoxy for applications to honeycomb core. The elastic properties developed in subsection 3.1.1 for PBZT provide important material properties for predicting the performance of an ultralightweight PBZT honeycomb core.

The flatwise compressive and shear properties of several structural honeycomb cores are presented in Table 3-2. Until recently, non-metallic cores such as Nomex and fiberglass have been limited to applications that do not require high specific stiffness due to their low shear moduli when compared to aluminum cores. The graphite/polymer (polyimide, phenolic, epoxy) honeycomb core developed by Hexcel meets or exceeds the specific shear stiffness of comparable aluminum cores.

Considerations in Design of Honeycomb Sandwich Structures

In our design analysis we consider a honeycomb core consisting of two thin facesheets as shown in FIG. 10. In flexure of the sandwich structure, the facings carry tensile and compressive axial loads while the core is designed to resist the shear load. Thus, the flexural stiffness is defined by two components, as in Equation 3-1 below, where D is the effect of the facesheets and N is the effect of the core. FIG. 11 illustrates how the deflection, y, is a combination of facesheet bending and core shearing.

$$y = \frac{K_b P a^3}{D} + \frac{K_s P_a}{N} \quad (3\text{-}1)$$

where $$D = \frac{E_f b(h^3 - c^3)}{12(1 - \nu^2)} \quad \text{Flexural Stiffness, facesheets}$$

and $$N = \frac{1}{2}(h + c)bG_c \quad \text{Shear Stiffness, honeycomb core}$$

and the variables are defined as:
$E_f$ = modulus of elasticity of facesheet
$G_c$ = core shear modulus
$\nu$ = Poisson's ratio
P = total load
a = span
b = width of core
c = core depth
$K_b$ and $K_s$ = constants depending on the beam loading
h = total sandwich thickness Optimum design of the core will minimize the deflection, y, with respect to the weight; that is, we need to maximize sandwich stiffness, D, and shear stiffness, N, and minimize the facesheet weight and core density.

For our design comparison, we considered the same facesheet material to evaluate the PBZT and the graphite/epoxy cores. Furthermore, we considered cores of the same thickness, since separation of facesheets is a function of geometry. The flexural stiffness-to-weight ratio of sandwich structures, then, can be improved through the following approaches=

Using facesheets of higher specific stiffness, as thin as possible

Increasing the facesheet separation distance by using a deeper core for higher section modulus Using a core material with high shear modulus.

Since the object of the invention is to produce ultralightweight structures, primary consideration is given to achieving low core densities using thin-film PBZT core with stiffness properties similar to those of a T-300 graphite/epoxy system.

Substitution of the lightweight PBZT core for a graphite core in a sandwich structure allows performance improvements through the second and third approaches, without increasing the structural weight. Also, since PBZT film is ultrathin, the cell size can be reduced without increasing core density. This has the added benefit of eliminating dimpling or wrinkling of facesheets. Stiff and precise support of optical tracking and surveillance systems as well as antenna arrays is possible. The analysis that follows evaluates the PBZT core against the graphite core for application to ULW sandwich structures.

Design of PBZT Honeycomb Core

The theoretical honeycomb core density, $p'_c$, is defined as (7):

$$p'_c = \frac{3t_c}{d} p \quad (3\text{-}2)$$

where
$t_c$ = core wall thickness
d = core cell size
p = core material density as described in FIG. 12.

The properties as reported by Hexcel for T-300/Ep(Table 3-2) (8) are nominal values based on:

$p'_c$ = 5 pcf d = 0.25 in.

$P_c$ = 0.056 lb/in.³

For the T-300/Ep system, the minimum core wall thickness that can be achieved is $t_c$=0.005 (0.127 mm). Biaxially-oriented PBZT film can be produced much thinner, thus giving the capability to develop ultralightweight honeycomb cores with smaller cell size, and lower density, in addition to benefits mentioned above.

Figure 13:
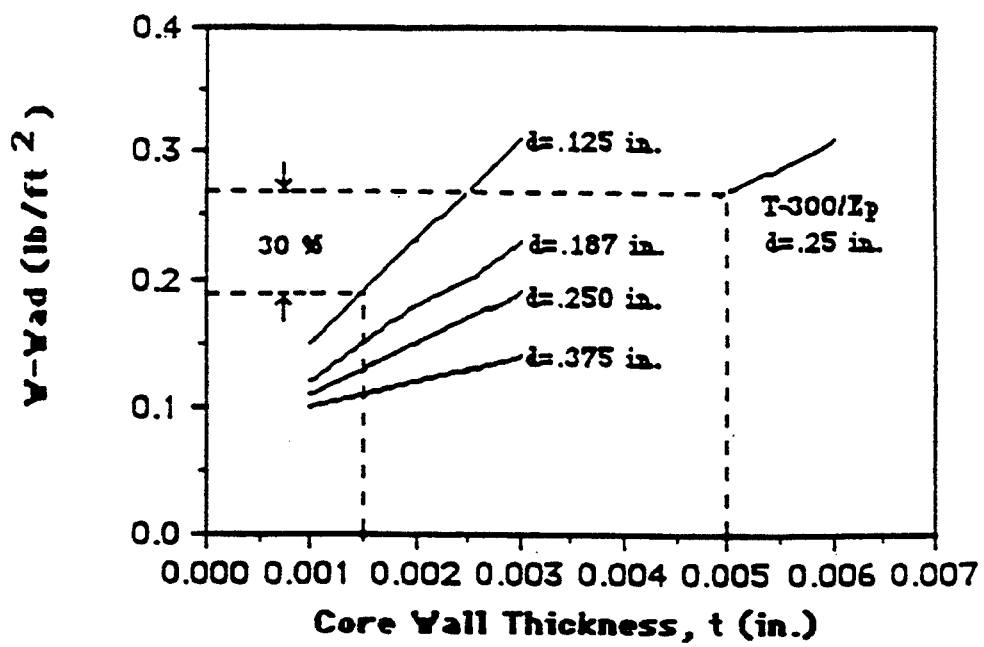
FIG. 13 shows the areal weight for PBZT core as function of cell wall $t_c$ and cell size, d.

To demonstrate the weight advantage of the thin-walled PBZT core, a performance curve constructed as FIG. 13 shows how cell wall thickness, $t_c$, and cell size, d, affects the areal weight. The weight per unit area of a honeycomb structure can be optimized (9,10)

$$(W - W_{ad}) = 2p_f t_f + \frac{8t_c}{3d} h_c \rho_c \qquad (3\text{-}3)$$

where $p_f$ and $t_f$ are the facesheet density and thickness, respectively; $h_c$ is the total sandwich depth and $w_{ad}$ is the weight of the adhesive used in the bonding of the core and facesheet.

Consider $h_c$, $p_f$ and $t_f$ to be the same for both the T-300/Ep and PBZT sandwich structures. Reference to FIG. 13 shows a 30 percent weight savings by substituting a PBZT core of $t_c$=0.0015 in. (0.04 mm) for a T-300/Ep core of 0.005 in. (0.127 mm) thick core wall. Next, we will demonstrate that the ultrathin PBZT film can produce a honeycomb core with the requisite shear stiffness-to-weight ratio.

The PBZT honeycomb core design was developed by imposing the following performance requirements that are equal or superior to the graphite/epoxy core material:

Effective transverse shear modulus

Local buckling due to flatwise compression of core wall

Overall in-plane elastic instability.

The theoretical stiffness properties of the ±45 deg. biaxially-oriented PBZT film are presented in Table 3—3. The ±45 deg. web orientation design of the core benefits from the maximum shear modulus property available from the film. The PBZT core was compared to a baseline core made of T-300 graphite/epoxy, corresponding to Hexcel's HFT-G honeycomb core. The goal is to optimize the stiffness-to-weight ratio by using the thin-walled PBZT core in place of the graphite/epoxy core.

Shear Stiffness Analysis

Vinson and Shore (10) in their method of analysis for honeycomb core sandwich structures, define effective transverse shear stiffness:

$$G'_c = \frac{4t_c}{3d} G_c \qquad (3\text{-}4)$$

where $G_c$=shear modulus of the core itself. The effective transverse shear modulus, $G'_c$, is taken to be in the ribbon direction, L, where the nodes along this direction are bonded, as previously indicated in FIG. 12. This would give a relative increase in effective shear modulus over the W direction.

Figure 14:
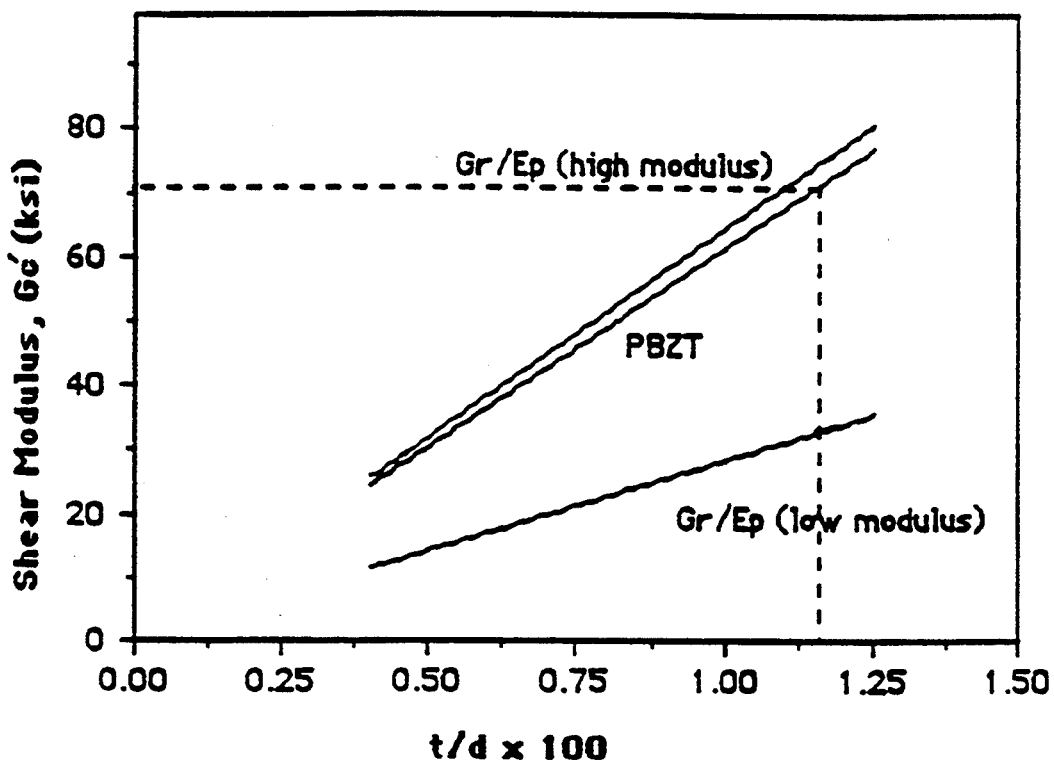
FIG. 14 shows the effective transverse shear stiffness as a function of core wall thickness to cell size ratio, tc/d.

A performance curve shown in FIG. 14 gives effective transverse shear modulus, $G'_c$, as a function of core thickness to cell size ratio ($t_c$/d) using the following core material properties:

±45 deg. T-300 Gr/Ep ($G_c$=4.85 Msi)

±45 deg. T-300 Gr/Ep from Hexcel ($G_c$=2.96 Msi, estimated)

±45 deg. biaxially-oriented PBZT ($G_c$=4.62, see Table 3—3).

The estimated value of $G_c$=2.96 Msi is based upon Hexcel's data for $G'_c$=71 Ksi and normalized values of $p'_c$=5 pcf and d=0.25 in. The curve for a typical ±45 deg. T-300 Gr/epoxy material ($G_c$=4.85 Msi) represents an upper limit based on a tow of <1000 filaments and $t_c$<5 mils, which would be difficult to fabricate into a core.

PBZT as a ±45 deg. biaxially-oriented thin-film can theoretically achieve an effective transverse shear modulus of ≧71 Ksi with a core thickness-to-cell size ratio ≦1/85. In keeping with the first criterion of achieving $t_c$<4 mils, one will find a $t_c$ min of 1.47 mils for ⅛ in. cell size (for $t_c$/d=0.01176).

In conclusion, a minimum effective transverse shear modulus of 71 Ksi is required of the PBZT honeycomb core. This criterion is met with a PBZT honeycomb core with the following properties:

$t_c$ = 1.47 mils $d_{max}$ = 0.125 in.

$G_c$ ≧ 4.62 Msi

Figure 15:
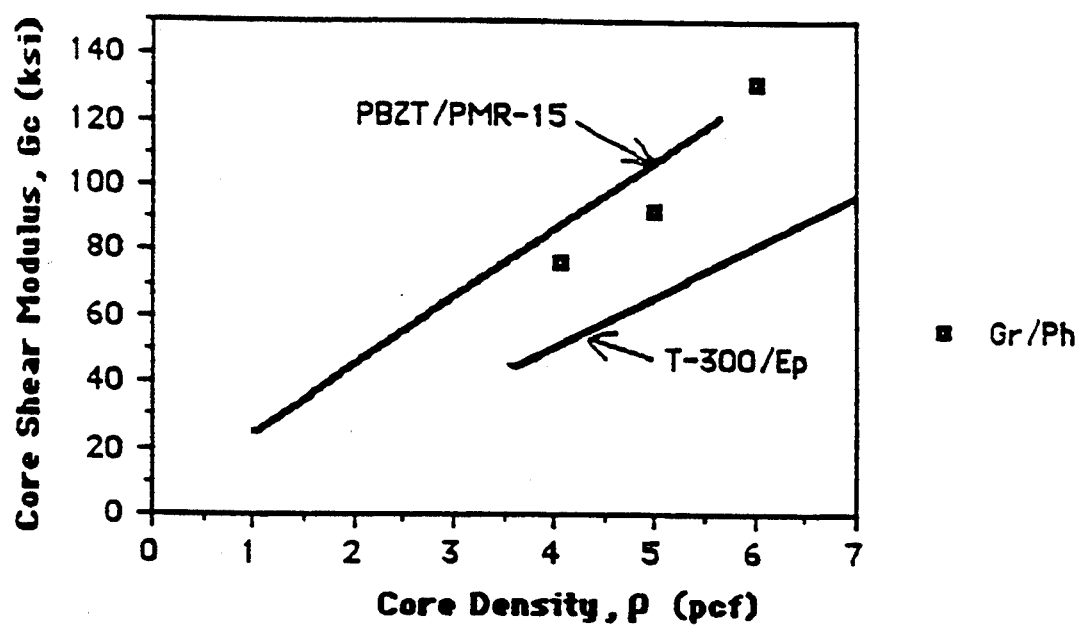
FIG. 15 shows core shear modulus as a function of core density for PBZT and T-300/Ep core, theory.. Data points for core shear modulus of three densities of graphite/phenolic (Gr/Ph) are for comparison.

Calculation for areal weight (Equation 3—3) for PBZT film with these properties can yield almost 30 percent weight savings over Hexcel's HFT-G core (5 pcf, d=0.25). This was shown graphically in FIG. 13 for w—$w_{ad}$ as a function of $t_c$ and d. In FIG. 15, the theoretical core density for ±45 deg. PBZT is found to be 3.3 pcf for shear stiffness of 71 Ksi, giving a core density which is 34 percent less than that of the HFT-G core with similar stiffness properties.

Flatwise Compressive Modulus Analysis

Figure 16:
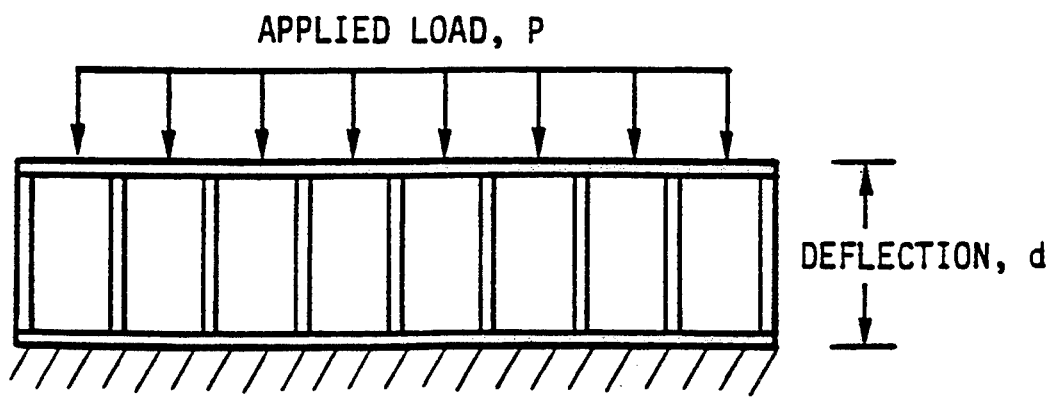
FIG. 16 shows a honeycomb core undergoing flatwise compression.

The compressive modulus of a honeycomb core sandwich undergoing flatwise compression, as shown in FIG. 16, is primarily a function of core density, $\rho_c$. Bruhn (7) expresses an empirical formula for a design curve as:

$$E'_c = 2.13 \frac{\rho'_c}{\rho_c} 1.415 E_c \qquad (3\text{-}5)$$

where $E_c$ is the compressive modulus of the core material and $E'_c$ is the flatwise compressive modulus of the honeycomb core.

High compressive strength or modulus as compared to aluminum cores is not demanded, since the orientation of the PBZT film is maximized to obtain high shear stiffness of the core. A nearly uniaxial film would be used as the core material if the design requirements called for a core of high compressive modulus. For SDI structures, compressive loading is a secondary consideration when designing honeycomb sandwich structures.

Analysis for Overall In-Plane Buckling

Figure 17A:
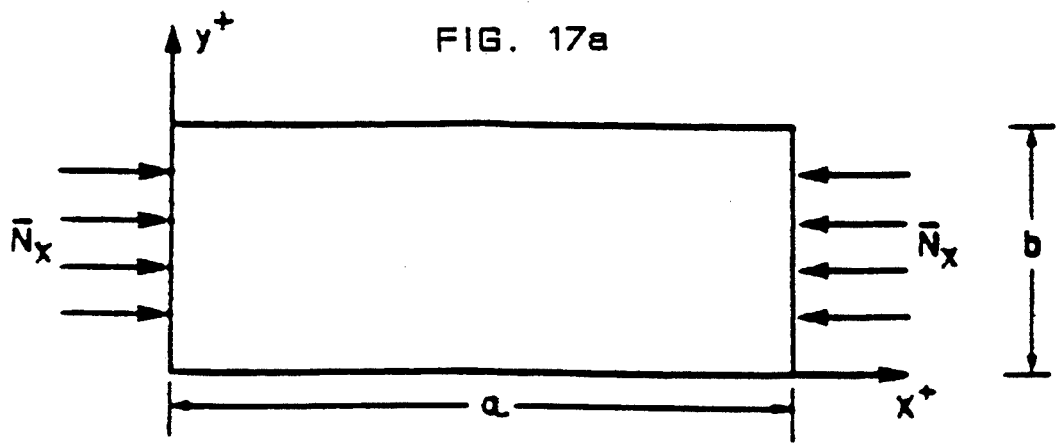
FIGS. 17(a) and 17(b) show a nomenclature for in-plane buckling of honeycomb core.
Figure 17B:
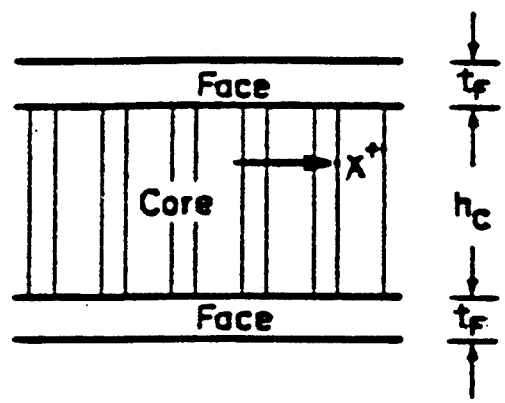

The overall buckling of honeycomb core sandwich structure is an important design criterion as it combines the effects of both compression and shear stresses on the sandwich. The critical stress for buckling of composite plate is given by Vinson and Shore (10) as:

$$\sigma_{cr} = \frac{\pi^2}{4(1 - \nu_{xy}\nu_{yx})} \cdot E_{fx} \cdot E_{fy} \frac{h_c^2}{b} \cdot k_m \qquad (3\text{-}6)$$

where $E_{fx}$ and $E_{fy}$ are Young's modulus of the facings in the x and y directions, respectively. FIGS. 17(a) and 17(b) show the geometry of the core height, $h_c$, and width, b, which is transverse to applied axial load, $N_x$. The critical buckling strength, act, given here takes into consideration the effects of orthotropic laminate properties. $K_m$, a constant determined by a parametric equation, is essentially a weighting factor for flexural stiffness and shear modulus properties (10).

Figure 18:
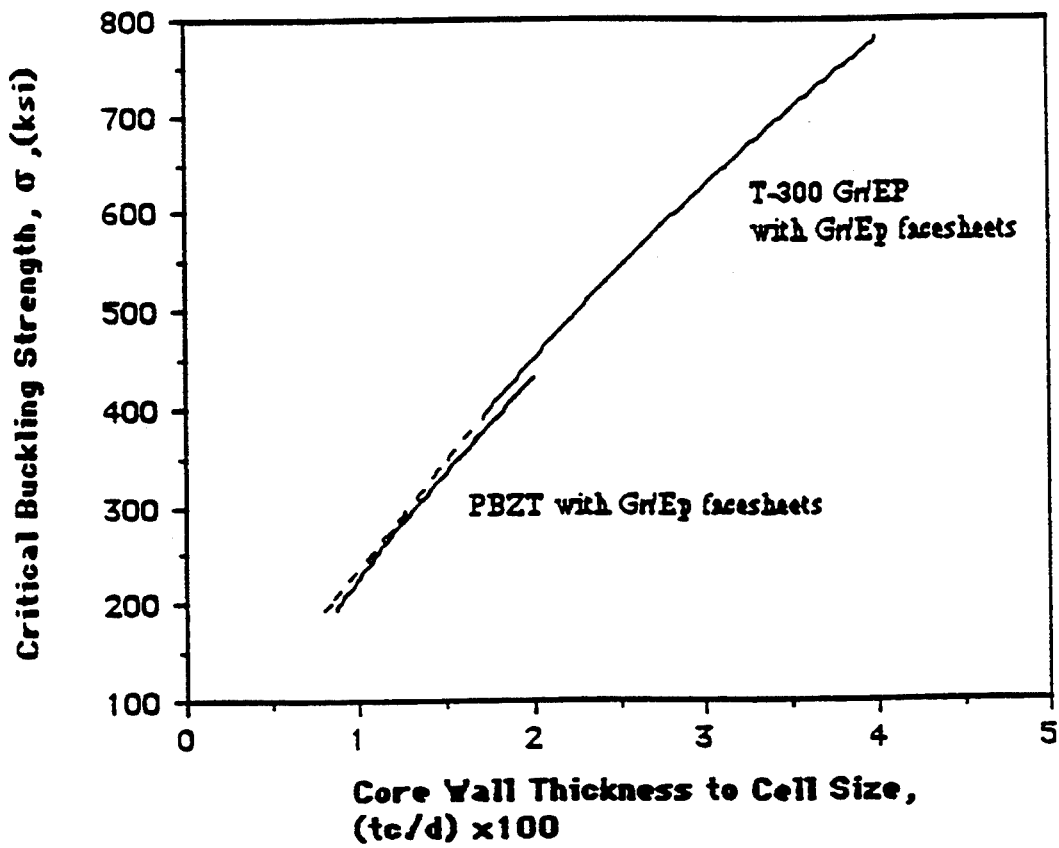
FIG. 18 shows the overall buckling of plate, $\sigma_{cr}$ as a function of core wall thickness to cell size ratio.

Application of Equation 3-6 to ±45 deg. biaxially-oriented PBZT and T-300 Gr/Ep system as a function of $t_c/d$ is graphically shown in FIG. 18. Two cases are considered.

1. T-300 Gr/epoxy core with T-300 Gr/epoxy faces (±45 deg. bias weave for both)
2. ±45 deg. PBZT core with T-300 Gr/epoxy faces (±45 deg. bias weave).

Although the curves for cases 1 and 2 are similar, PBZT, as an ultrathin material, is shown to achieve the same critical buckling stress as the Gr/epoxy core. For example, a PBZT core with $t_c$ of only 0.0025 in. and d=0.125 in. would achieve the same critical buckling strength as that of the nominal Gr/Ep core.

The buckling mode given by Equation 3-6 is for a load applied in the axial direction (x-direction) of the sandwich structure. This mode of buckling will be the lowest failure mode if the following condition is met:

$$V_x < \frac{5}{2} \sqrt{\frac{E_{fx}}{E_{fy}}} \qquad (3\text{-}7)$$

where $V_x$ is the shear load applied in the x-direction (10).

If the condition in Equation 3-7 is not met, then there is the possibility of failure due to core shear instability. This will occur at a load lower than that necessary to induce overall buckling of the honeycomb sandwich structure. For both PBZT and Gr/Ep system, this lower limit is reached at $t_c/d$ of 1/125 and $\sigma_{cr}$ of 200 Ksi. This lower limit can only be achieved by Gr/Ep core if the core wall thickness can be made 0.002 in. (0.051 mm) thick, which is not possible by current processing methods. The portion of the curve for the Gr/Ep system shown as dashed lines represents limits placed on achieving a minimum ratio of wall thickness to cell size for the core and yet maintaining a critical buckling strength of at least 200 Ksi. PBZT, as an ultra-thin film, can be fabricated into an ultralightweight honeycomb core with cell walls as thin as 0.001 in (0.025 mm) for 0.125 in. (3.18 mm) cell size for the same buckling strength. Thus, the PBZT core design is dictated by the ability to achieve the thinnest wall possible rather than mechanical properties of the core material.

3.2 Fabricating PBZT Honeycomb Core

In this section, a method for fabricating PBZT honeycomb core is described. The process comprises three basic steps=extrusion of biaxially-oriented film, introduction of secondary material, lay-up and curing of the core to final dimension. Emphasis is placed on demonstrating the potential for low-cost, high-production-rate manufacturing.

3.2.1 Film Processing

Approximately 100 ft. of biaxially blown PBZT film tubing was extruded from 30 intrinsic viscosity (IV) dope. See Ser. No. 07/098,710. The dope was previously degassed in a vented twin-screw extruder for at least one minute to ensure homogeneity and eliminate air bubbles. The PBZT film was extruded in two different orientations, ±10 deg. and ±45 deg. from machine direction (MD). Final thickness upon coagulation and drying, see Ser. No. 07/098,710, was 1.5±0.7 mils. The tubes were infiltrated with resin as described next to form a "prepreg."

3.2.2 Secondary Material

Two resins were selected to form an interpenetrating network in PBZT film. Both resins, Tactix 695 epoxy resin, available from Dow Chemical Co., and PMR-15 thermosetting polyimide, available from Hysol, which is a norbornenyl-lapped addition-type polyimide resin, which is based on the polyermization reaction of three monomers: (a) mono-methylester of 5-norbornene-2,3-dicarboxylic acid (NB); (b) methylenedianianiline (MDA); and (c) dimethylester of 3,3',4,4'-benzo-phenontetracarboxylic acid (BTDE), in neat form, show good mechanical properties and have excellent thermo-oxidative resistance. Furthermore, these resins are supplied in oligomeric form, ideal for infiltrating the microporous PBZT network.

Figure 19:
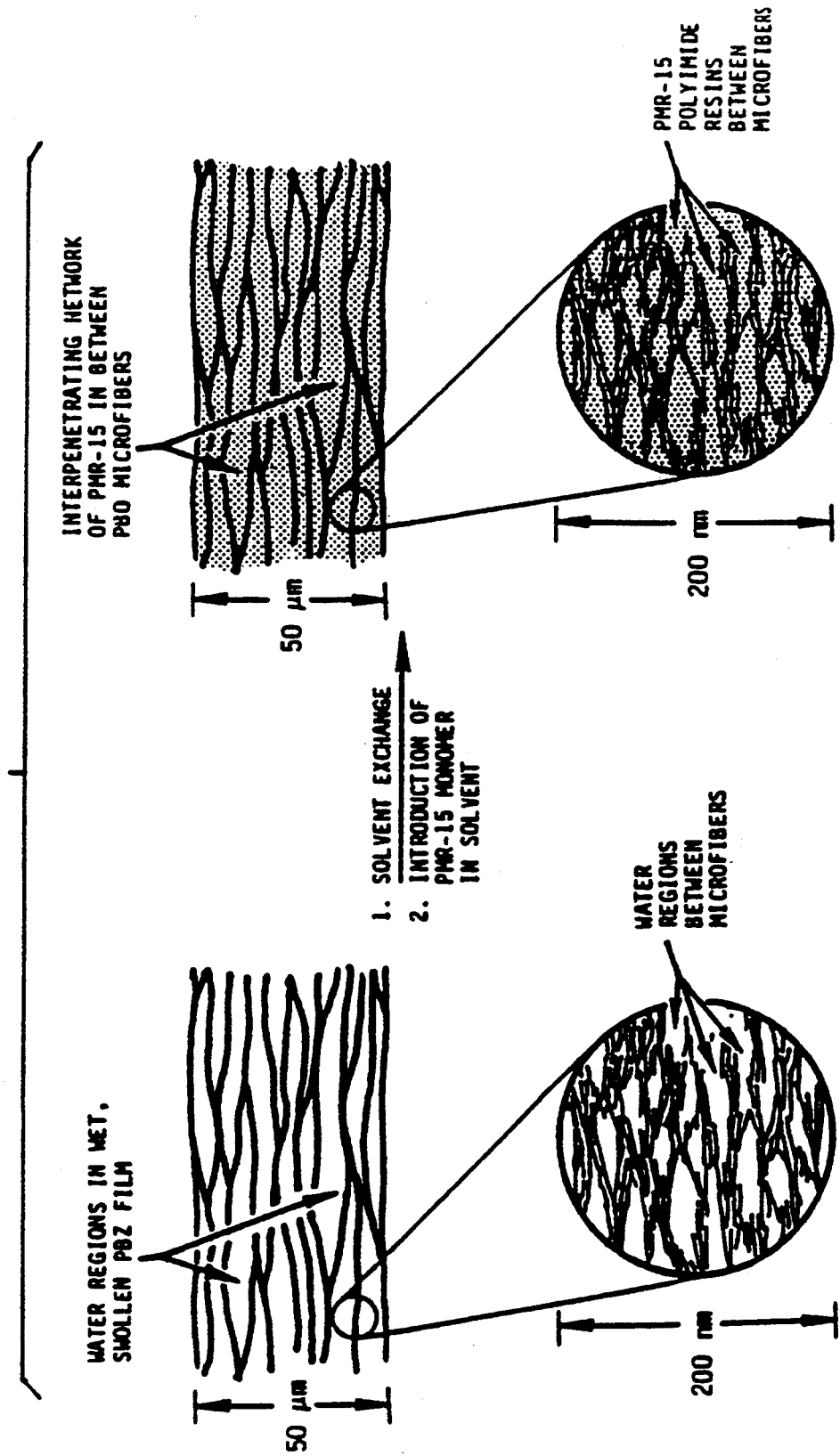
FIG. 19 shows the introduction of PMR-15 monomer to encapsulate microfibril network.

FIG. 19 illustrates how water in coagulated film is replaced by solvent in a solvent-exchange process. 100 percent water-swollen film is exchanged in stepwise fashion for 100 percent solvent such as tetrahydrofuran (THF) or methanol to prevent the microporous PBZT structure from collapsing. The open structure then allows the monomers to infiltrate and encapsulate the microfibrillar network throughout the film during the curing process.

Infiltrated PBZT tubes are dried in a tube furnace for 5 hrs. at 200° F. under axial tension and radial pressure to drive off the excess solvents. After drying, the tubes were removed and slit open in the machine direction into flat sheets. The resin-impregnated PBZT film was then ready to be fabricated into honeycomb cores.

3.2.3 Fabricating the Honeycomb Cores

Figure 20:
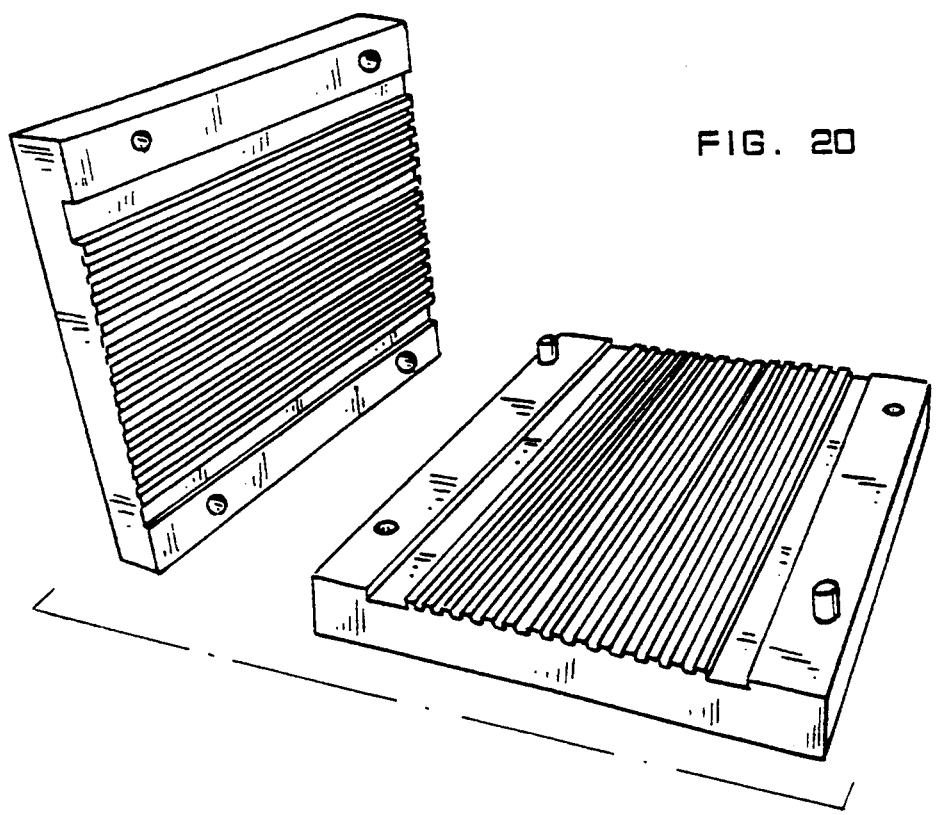
FIG. 20 is a perspective view of the 4 in. W×6 in. L Teflon-coated corrugated compression mold made of 420 SS.

A mold was specially designed by Foster-Miller and machined of 420 stainless steel. FIG. 20 shows the two halves of the mold. The upper and lower pieces consist of corrugated channels shaped as ⅛ in. hexagonal cells when closed and viewed end-on. A PBZT sheet 4 in. wide×6 in. long×1 to 1.5 mil thick can be placed in the Teflon-coated mold to yield a 12-cell corrugated sheet.

The procedure for fabricating the core consists of several operations. First, two 4×6 in. sheets of PBZT/PMR-15 or PBZT/Tactix prepregs (referred to generally as PBZT/TS, where TS stands for "thermoset resins", although PMR-15 is considered to be psuedothermoplastic) are cut from the slit tube. Two sheets of 4×6 in. film will yield a 1.5 in. W×3.0 in. L core of 0.5 in. height. Steps to complete the process include thermal forming, application of primary node and secondary node adhesive, and bonding of facesheets, for example uniaxial (0 deg.) 2-ply graphite/epoxy facesheets.

Thermal Shaping

Figure 21:
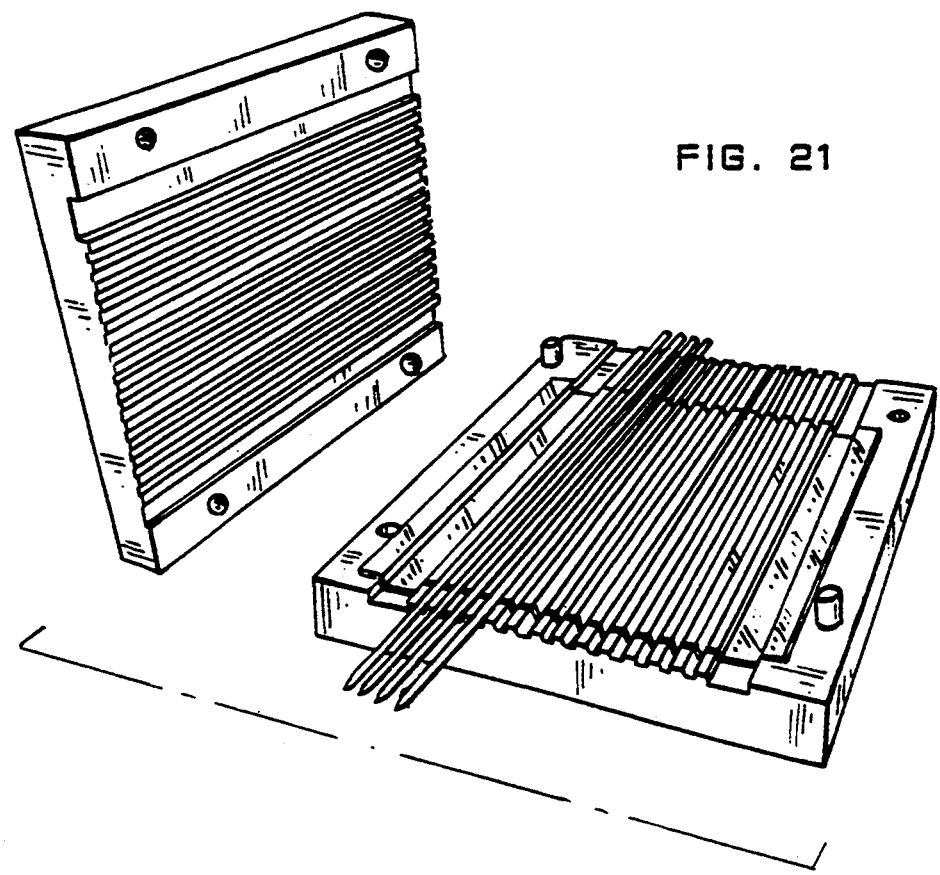
FIG. 21 shows the placement of Teflon rods on PBZT/TS sheets in mold. Rods force PBZT/TS into hexagonal contours of mold.
Figure 25:
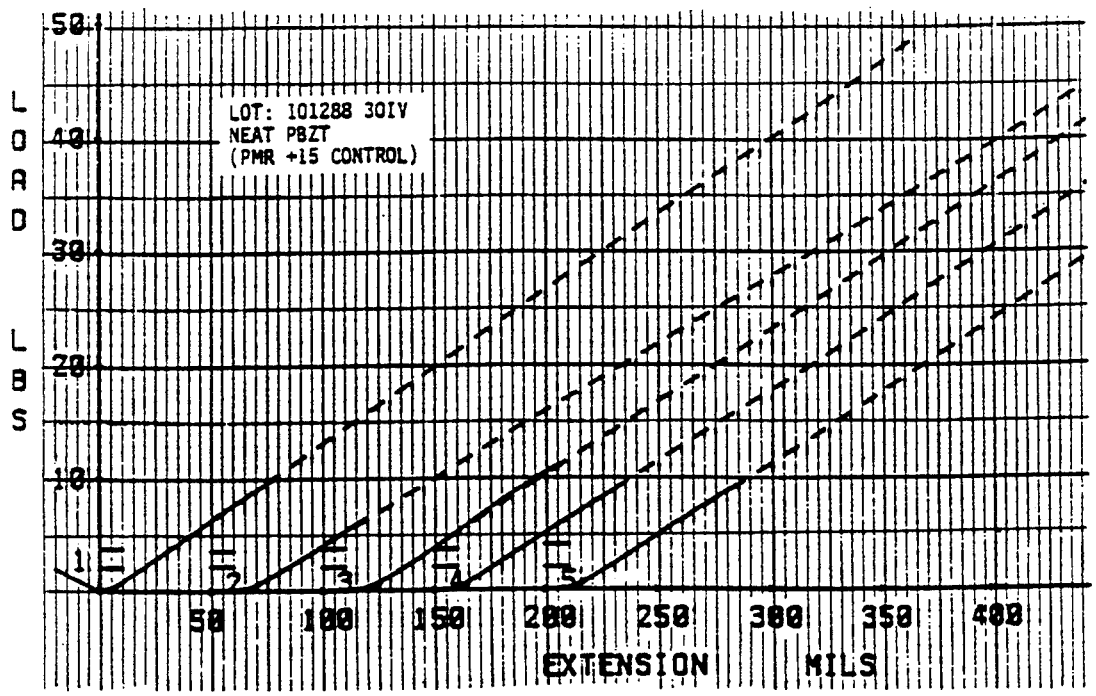
FIG. 25 is a load-deflection curve for neat PBZT.
Figure 26:
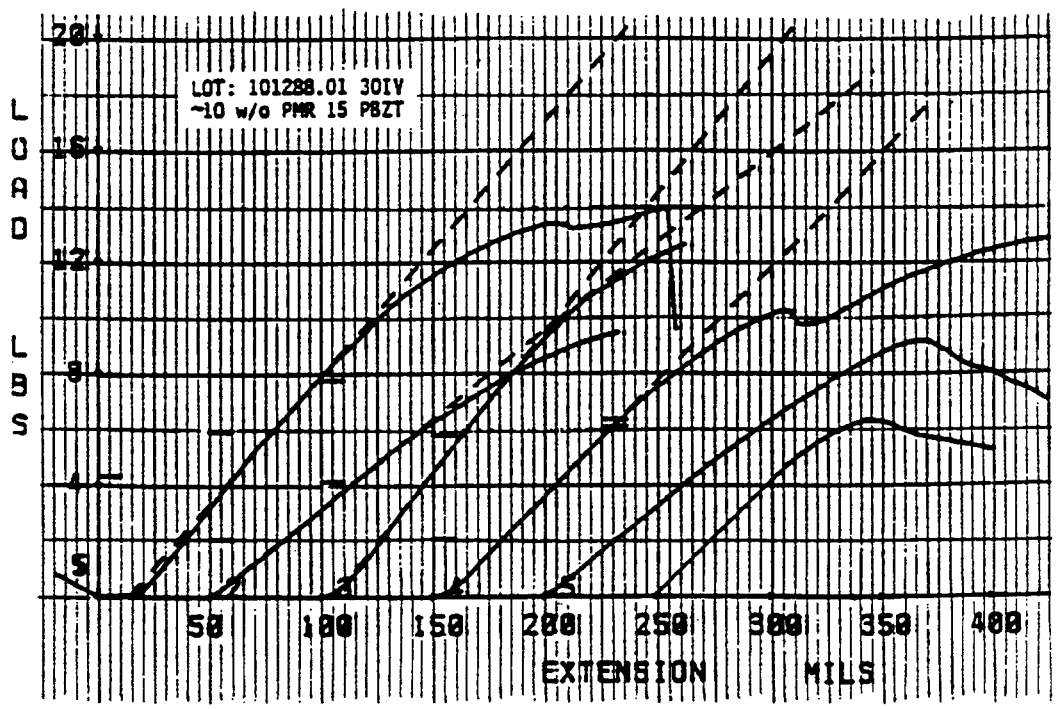
FIG. 26 is a load-deflection curve for PBZT/PMR-15.
Figure 27:
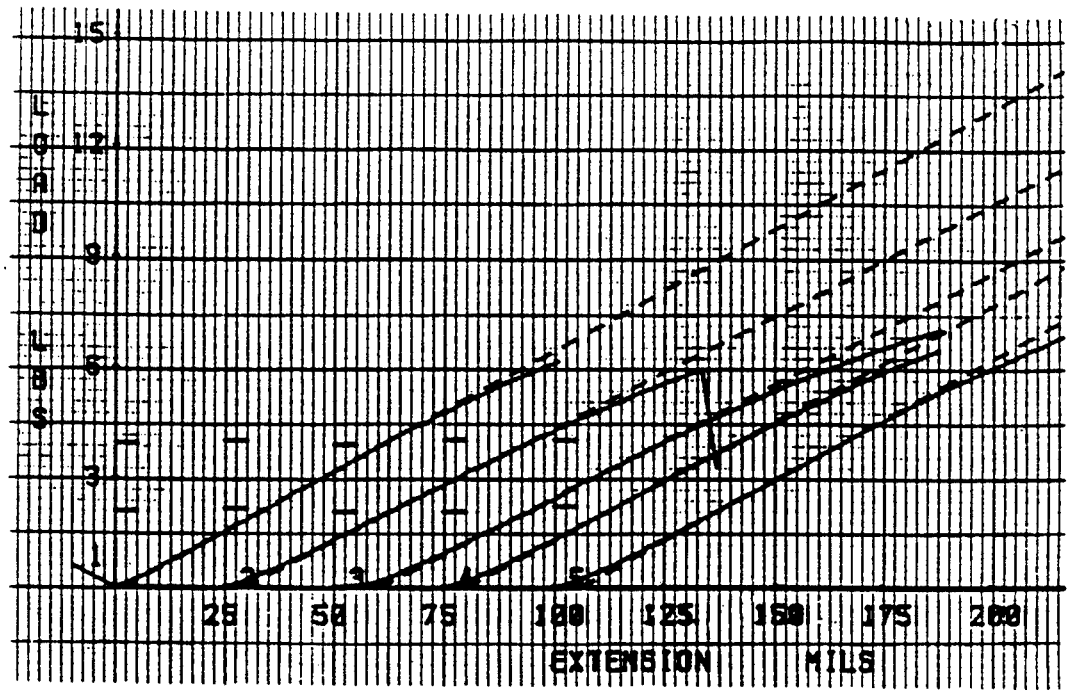
FIG. 27 is a load-deflection curve for neat PBZT.
Figure 28:
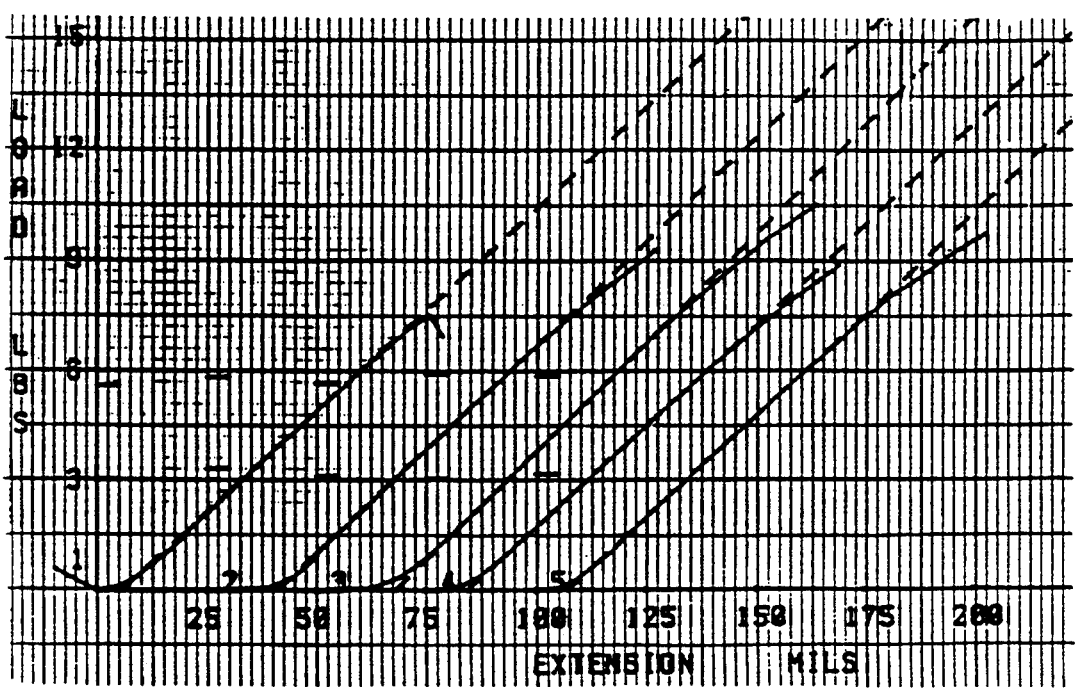
FIG. 28 is a load-deflection curve for PBZT/Tactix.

A thermal shaping operation cures the resins in the PBZT film to "lock" in the hexagonal geometry of the PBZT/TS sheets. To do this, the two 4×6 in. sheets of the TS "prepregs" are placed in between the two halves of the mold (which is slightly separated by a gap of 0.050 in.). One-eighth inch diameter×8 in. long Teflon rods are then inserted in between the sheets as shown in FIG. 21. Due to the relatively great thermal expansion of the compliant Teflon rods, they will expand upon heating, forcing the PBZT/TS film to conform to the exact geometry of the mold during the processing cycle.

The mold is then placed, for example, in the programmable MTP 14 Tetrahedron press with active cooling. FIGS. 22(a) and 22(b) give the cure cycle used for each resin system. In each case, a pressure of 100 psi is applied to the mold throughout the cycle. Fully cured, corrugated PBZT/TS sheets are produced at the end of the thermal forming cycle.

Primary and Secondary Bonding

The primary bond is the first of two bonding steps required to complete the core. In this step the two thermally formed PBZT/TS sheets are bonded together to form a single layer hexagonal sheet as shown in FIG. 23.

Hysol's EA9346 aerospace adhesive is used for node bonding. This is a one-component paste bisphenol-A-based epoxy adhesive that has high peel strength and high shear strength. The adhesive cures in 1 hr. at 250°F.

Primary Bonded Single Layer Hexagonal Cellular Sheet

To prepare the PBZT/TP sheets for bonding, the mold is again used to align the sheets and apply even pressure along the 6 in. long bond line. To minimize running of the adhesive into the interior of the cell walls, the $\frac{1}{8}$ in. diam. Teflon rods are, again, inserted between the PBZT/TP sheets. The assembled mold is then placed in the Tetrahedron press and the adhesive is cured under an applied pressure of 100 psi. Very smooth, consistent bond lines are achieved with this method.

Secondary Bonding

Once the primary bond lines are cured, 0.5 in. wide strips are carefully sliced from the hexagonal cellular sheets as shown in FIG. 24. Adhesive is applied along the 0.5 in. long bond lines on the outward-facing outer surfaces of the individual strips, and then the individual strips are stacked up. Teflon rods are inserted, again, to contain the adhesive at the bond nodes. Curing of the adhesive is carried out at 250° F. This final step produces a 3 in. L×1.5 in. W×0.5 in. thick PBZT/TS honeycomb core.

Application of Graphite/Epoxy Facesheet

Graphite/epoxy was selected as the facesheet material based on our design analysis. The AS-4/3501-6 composite is well characterized and, at 0.056 lb./in.$^3$ complements our object of fabricating an ultralight-weight PBZT/TP sandwich structure. Application of the graphite/epoxy facesheet is straightforward.

The facesheets can also be made of the core film material.

Two AS-4/3501-6 prepregs were laid-up and cured according to standard curing cycle in an autoclave. The unidirectional panels were cut into 1.5 in. W×3.0 in. L facesheets with the fibers along the L direction. A thin coating of the EA9346 adhesive was spread on the facesheet and the core carefully placed on top. Only one facesheet at a time was applied and cured so as to minimize any running of adhesive into the interior of the cell walls.

Twelve samples of a 1.5 in. W×2.0 in. L×0.5 in. thick PBZT/TS sandwich with graphite/epoxy facesheets were fabricated. Six were of the PBZT/Tactix type and the remainder PBZT/PMR-15.

3.3 Testing and Characterization

In this task, a test matrix for PBZT/TP sandwich structure was designed to correlate experimental values with those of the design analysis. Tensile and modulus properties were measured for neat PBZT and PBZT/TS films to study the effects of impregnation of films with resins. Stiffness properties were derived from four-point flexural tests of the novel PBZT/TS sandwich structures. Also, the sandwich structures were subjected to flatwise compression tests to determine compression modulus. Finally, thermomechanical analyses were conducted to determine coefficient of thermal expansion for the sandwich structures. Test results as well as a study on optimizing the ULW PBZT/TS sandwich structures is discussed.

3.3.1 Tensile Testing of Neat PBZT and Impregnated PBZT Film

Tensile tests were conducted for both neat ±45 deg. biaxially-oriented PBZT film and for films impregnated with Tactix and PMR-15 resins. Two sets of neat PBZT films were stage dried according to cycles used for curing Tactix and PMR-15 resins (see subsection 3.2.2.) to act as controls for the impregnated films. The impregnated films were also cured under pressure according to the cure cycle for each resin. This provides a comparative measure between neat and treated films.

A 20K universal testing machine was set up with a 100 lb. load cell and cross-head mounted extensometer. Tests were conducted in accordance with the ASTMD882/11-86 standard for tensile properties of thin plastic sheeting. A strain rate of 10 percent/min. was applied to the samples.

The results of tensile testing are summarized in Table 3-4 along with modulus values. FIGS. 25 through 28 show typical load-versus-extension curves for both neat and impregnated PBZT films tested in machine direction (MD).

A decrease in modulus and increase in elongation of impregnated PBZT is apparent over that of neat PBZT films. Even in low quantities (about 10 percent volume), the PMR-15 and Tactix resins have an pronounced effect on the properties of PBZT/TS microcomposites. Both films show greater than 60 percent loss in modulus. Of interest is that for PMR-15 impregnated films, only a 24 percent loss in tensile strength was noted compared to 61 percent loss in Tactix 695. Furthermore, the films should have similar tensile strengths when tested in either machine-(MD) or transverse-(TD) direction. So despite the loss in strength and modulus of both impregnated PBZT films, the PMR-15 polyimide resin shows promise as a secondary material for PBZT microcomposites.

Figure 29:
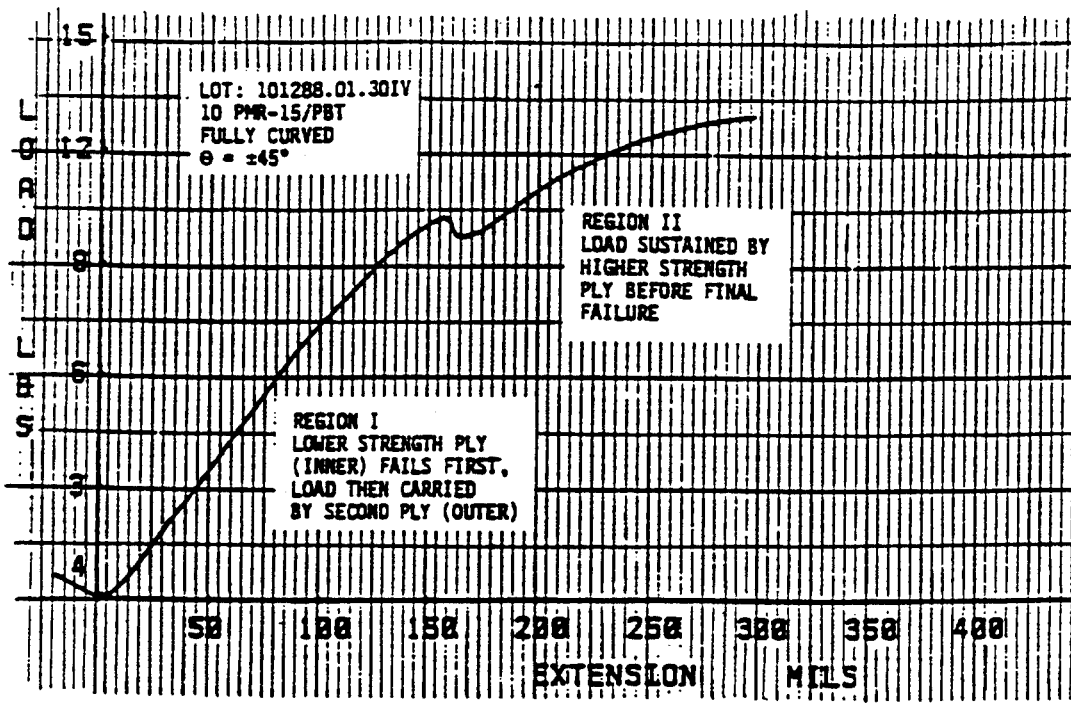
FIG. 29 shows two failure regions for deg. biaxially-oriented films.

All samples failed in shear along the deg. axis to machine direction (or transverse direction). An interesting feature is noted on some of the load-extension curves. FIG. 29 shows such a curve for a PBZT/PMR-15 tensile specimen. There are two regions where failures take place. Region Z shows one of the two ±45 deg. "uniplies" of PBZT "laminate" (as discussed in subsection 3.1) failing in shear. Once the first uniply has failed, the load is taken up by the second ply of higher shear strength, which sustains the applied load until total failure occurs.

3.2.2 Four-point Flexural Test of PBZT/Tp Sandwich Structures

Four-point flexural tests were conducted for the PBZT/Tp sandwich structures. Two-ply unidirectional AS-4/3501-6 facesheets were applied to all samples tested. Prior to testing, core densities were determined based on dimensions of the cores:

$t_c = 1.47$ rail (average)

d = 0.125 in.
h = 0.50 in.
L = 3.0 in.
W = 1.5 in.
and their actual weight (without the Gr/p facesheets).

Figure 30:
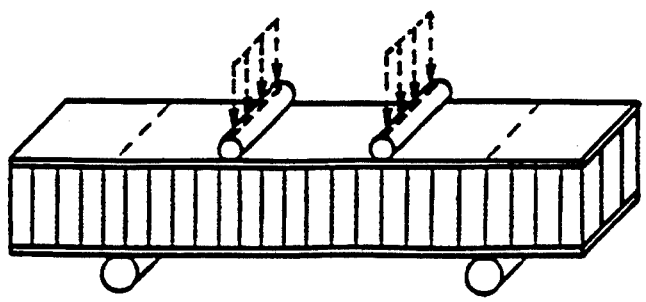
FIG. 30 is a schematic diagram showing a setup for four-point flexural test.
Figure 31A:
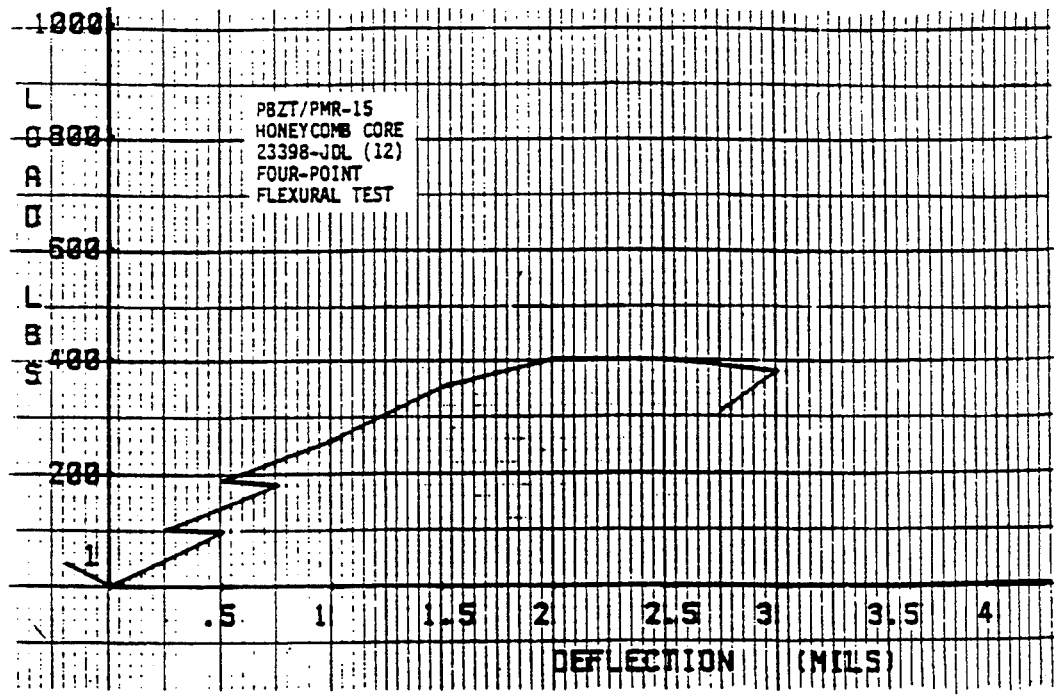
FIGS. 31(a) and 31(b) show load-deflection curves for four-point flex of two PBZT/PMR-15 sandwiches.
Figure 31B:
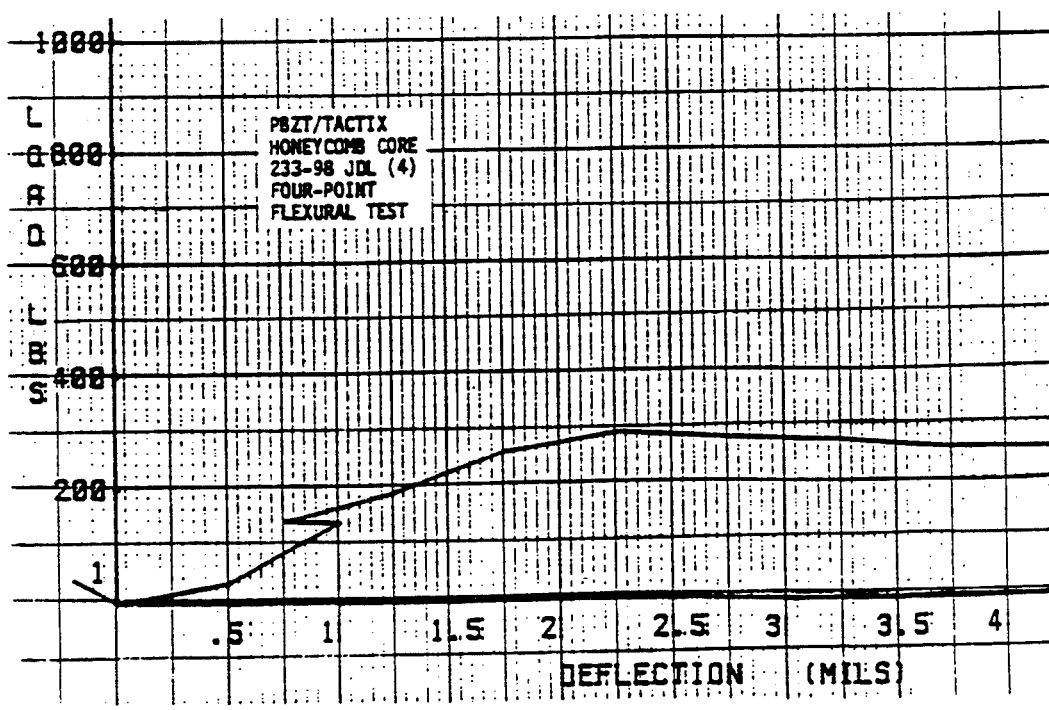

As indicated before, test specimens were fabricated to meet ASTM C-393 standards for flexure test of flat sandwich construction. Test specimens were loaded at two-quarter span points, as FIG. 30 illustrates. Data taken from the load-deflection curves shown in FIGS. 31(a) and 31(b) were used to determine sandwich stiffness, core shear strength, and modulus.

Deflection was measured at the midpoint of the lower facesheet. Three samples of PBZT/Tactix and four of the PBZT/PMR-15 were subjected to flexural testing.

When a typical specimen was subjected to four-point loading, local buckling and 45 deg. diagonal striations of microfibrils were noted at the PBZT/TS core walls. These elastic instability features were constrained to the region between the upper and lower loading bars. This is an excellent example of a hexagonal core sandwich undergoing core shear. No other failure modes, such as debonding of facesheets or facesheet failure, were noted. This demonstrates that the facesheet's material and adhesive are compatible with the PBZT/TS material.

Table 3-5 tabulates core density, shear strength, and modulus of the PBZT/TS sandwich structures. The PBZT/PMR-15 core exhibits higher shear strength and superior shear modulus over that of PBZT/Tactix 695 cores.

The following gives a method for calculating core shear modulus $G'_c$. Sandwich stiffness, D, is calculated using typical modulus properties of the AS-4/3501-6 facesheet material. Equation 3.1 can be rewritten to solve for shear stiffness, N, in terms of maximum load, P, and deflection, y:

$$N = \frac{K_s P a D}{D_y - K_b P a^3} \quad \text{Eq.c.1}$$

Core shear modulus, $G'_c$, then is found as: (14)

$$G'_c = \frac{2N}{(h + c)b} \quad \text{Eq.c.2}$$

using variables previously defined under subsection 3.1.

The validity of core shear modulus, $G'_c$ is checked by comparing the contributions to total deflection, $Y_T$, by $Y_B$ (due to bending) and $Y_s$ (due to shear), that is:

$$Y_T = Y_B + Y_s$$

The short specimen geometry of the honeycomb core was specifically designed so that the deflection due to shear, $Y_s$, would yield a greater contribution to overall deflection, $Y_t$, than the deflection due to bending, $Y_B$. That is, $Y_s > Y_B$. In fact, calculations for $Y_s$ and $Y_B$ in Equation 3.1 of subsection 3.1 give a ratio of $Y_s = Y_B$ of approximately 3.5:1.0. The PBZT core does behave as a beam undergoing shear.

Table 1—1 (mentioned previously) compares properties of PBZT/PMR-15 cores with other commercially available cores. While core shear strength is low, we have demonstrated, through design analysis and testing, that a core of high shear modulus can be achieved with thin film PBZT/PMR-15. Specific shear stiffness as high as $34 \times 10^6$ in. ($8.6 \times 10^5$ m) has been recorded. Furthermore, copious use of adhesive in node bonding would allow further reduction in core weight for improved specific stiffness. Theoretical core density of PBZT core with 0.0015 in. thick core walls and 0.125 in. cell size is 3.19 pcf. However, this does not take the adhesive's weight into consideration. Using typical bond lines of 5 to 7 mils (11) for Hysol's EA 9346 adhesive, calculations show that adhesives should account for only 34 to 40 percent of total core weight.

As an example, consider the 5.68 pcf PBZT/PMR-15 core. Optimizing this core for adhesive content would give a 29 percent reduction in weight. If the 4.04 pcf core exhibits the same shear stiffness of 112.6 Ksi, its specific shear stiffness would increase significantly to over $40 \times 10^6$ in. Finally, thin-walled (less than 5 mil) PBZT cores can be fabricated with cell size of $\frac{1}{8}$ in. or less and yet achieve low core density (5 pcf or less) required of ultralightweight structural design. The thin, high-modulus core walls and small cell size minimize facesheet wrinkling and dimpling. This allows future designs to use thin, high-modulus facesheets such as PBZT or PBO, giving further reduction in weight.

3.3.3 Flatwise Compressive Strength and Modulus

Flatwise compression tests were conducted for two PBZT/PMR-15 honeycomb cores. Both samples exhibit low values of compressive strength and modulus compared to Gr/Ep and 5052 aluminum cores. A discussion on improving compressive strength and modulus by improvements in design and fabrication techniques is presented in this subsection.

Figure 32:
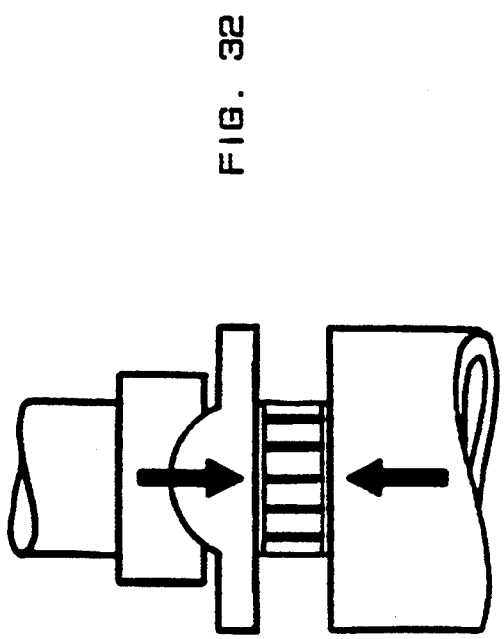
FIG. 32 shows a setup for flatwise compression test.
Figure 33A:
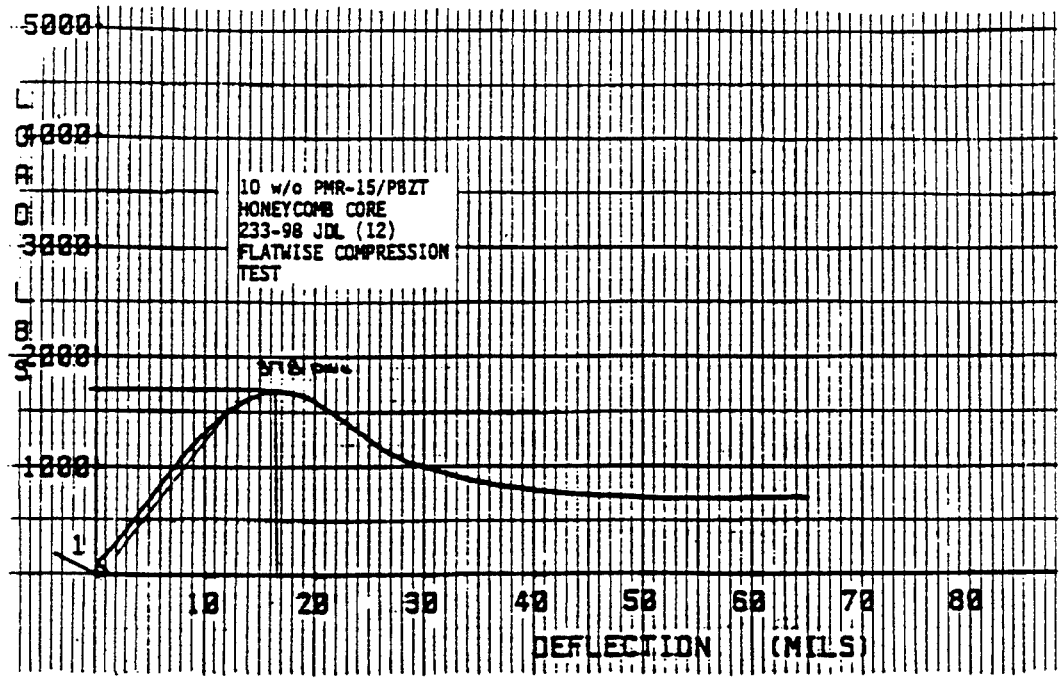
FIGS. 33(a) and 33(b) are load-deflection curves for flatwise compression test of PMR-15/PBZT core.
Figure 33B:
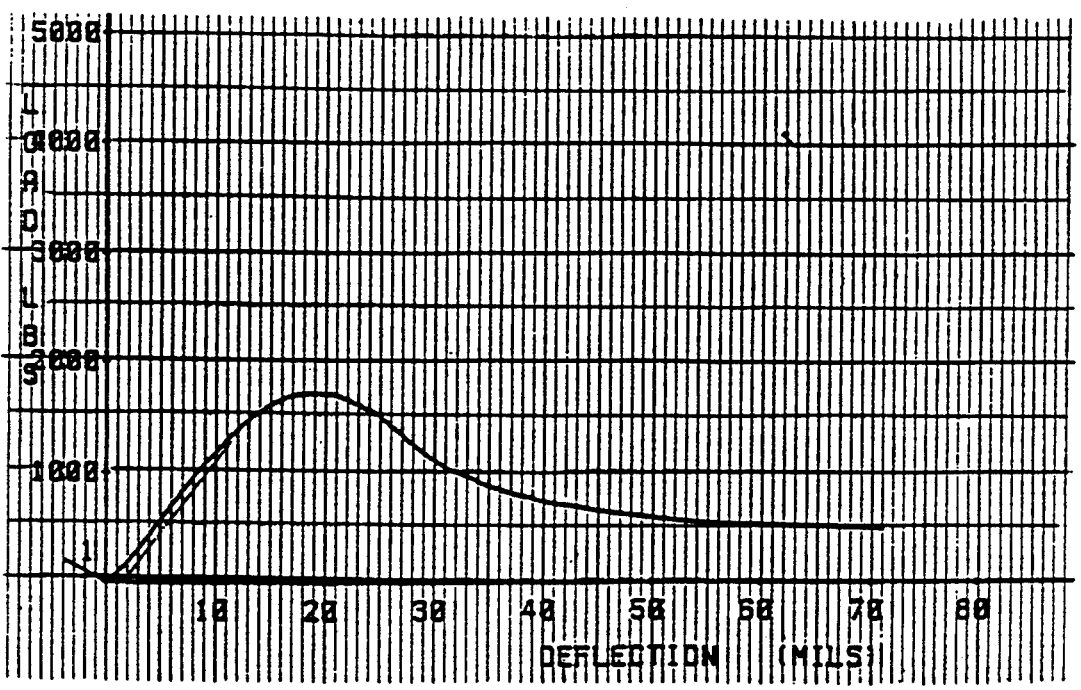

FIG. 32 is a schematic diagram of a test set-up using self-aligning discs for loading of samples. 3.0 in. L by 1.5 in. W samples were subjected to a constant loading rate of 0.025 in./min. Deflection was measured from a crosshead mounted extensometer. Samples were loaded until steady-state loading was reached.

The low compressive strength and modulus observed can be attributed to the design and hand fabrication of the PBZT cores. The ±45 deg. core walls are designed to provide a sandwich structure of high shear stiffness. The high shear modulus film has a low Young's modulus, $E_{11}$, as predicted by laminated plate theory. The effect is that the microfibrils, being off-axis to loading direction, contribute very little resistance to loading. Furthermore, the cell walls between nodes buckle at a relatively low stress level, which requires the nodes to operate at a higher stress level than that of a uniform stress distribution of the total cell wall cross-section (7).

In terms of test standards, the small samples (1.5 in W × 3.00 in. L) tested have an aspect ratio (L to W), of 2 to 1. This introduces large edge effects, leading to instability at the edges of the core during loading and hence, low resistance to load. Standards call for sample sizes to be at least 4×4 in. to minimize these effects.

Figure 34A:
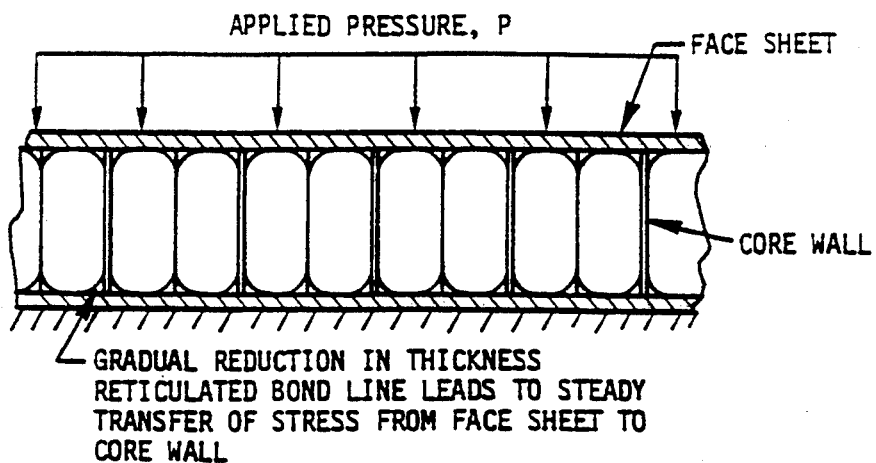
FIGS. 34(a) and 34(b) illustrate how inconsistent bond lines lead to local buckling at the thin-film core walls.
Figure 34B:
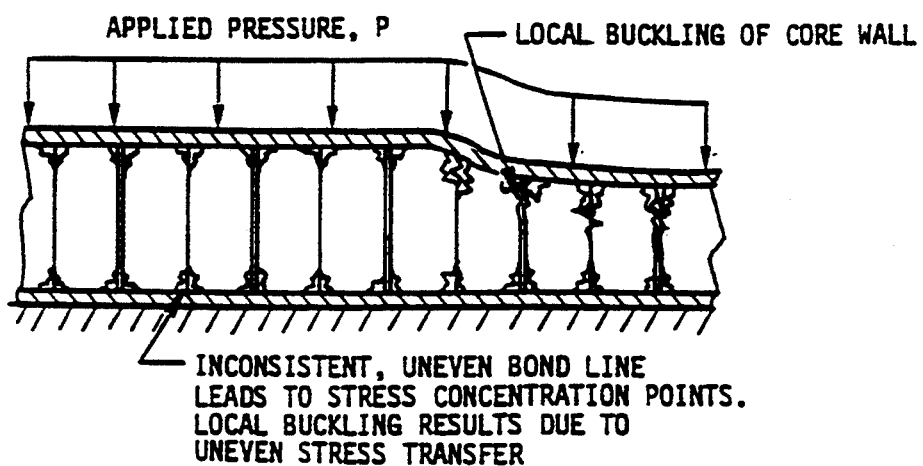

Finally, since reticulating adhesive was not used for bonding facesheets to core, the handmade cores have stress concentrations. FIGS. 34(a) and 34(b) show how inconsistent bond lines would lead to local buckling of the thin-film core wall due to nonuniform stress loading during flatwise compression.

3.3.4 Coefficient of Thermal Expansion

Coefficient of thermal expansion (CTE) was measured for both PMR-15 and Tactix impregnated honeycomb sandwich cores in out-of-plane direction. Samples show near-zero CTE behavior over a wide temperature range of −50°C. to 0.0625 in. square (40.3 mm$^2$) samples were extracted by cutting along the cell axis direction from bulk PBZT honeycomb sandwich cores with AS-4/3501-6 facesheets and mounted in a modified quartz glass sample holder. CTE's in the cell axis direction were measured from $-50°$ to $+150°$ C. with the Perkin-Elmer thermal mechanical analyzer (TMA). Table 3-7 compares the results of CTE measurements for the two samples against other honeycomb cores.

Dimensional control of platforms for SDI space-based applications requires materials with high specific stiffness and near-zero CTE. Honeycomb core sandwich structures using PBZT as the structural material can achieve these goals. In addition to high specific shear stiffness ($34 \times 10^6$ in.), we have demonstrated that near-zero CTE is possible for PBZT honeycomb sandwich structures.

4. Conclusion

We have demonstrated, through design and testing, that an ultralightweight honeycomb sandwich core with high specific stiffness properties can be fabricated from ultrathin, biaxially-oriented PBZT film. The dimensionally stable core will allow platform-mounted tracking and surveillance systems to maintain accuracy and precision under constant thermal cycling. The potential for rapid fabrication and scale-up will enhance stiffness properties as optimum weight adhesive and consistency in bonding will eliminate built-in areas of stress concentrations and local buckling failures at the core walls.

4.1 Further Embodiments of PBZT Honeycomb Core

The PBZT honeycomb core can be scaled-up for low-cost, high production rate manufacturing using currently available fabrication techniques, including Foster-Miller's techniques for processing thin, biaxially-oriented ordered-polymer films such as PBZT and PBO from lyotropic solutions, mentioned above. High speed personal computers (PCs), microprocessors and state-of-the-art sensors can be used for "smart" processing of biaxially extruded ordered-polymers (both thermotropic and lyotropic liquid crystalline polymers). Tight control over the film's orientation and processing conditions plus feedback loops permits high-performance, high-quality films to be extruded for subsequent processing into stiff, ultralightweight structures.

Figure 35:
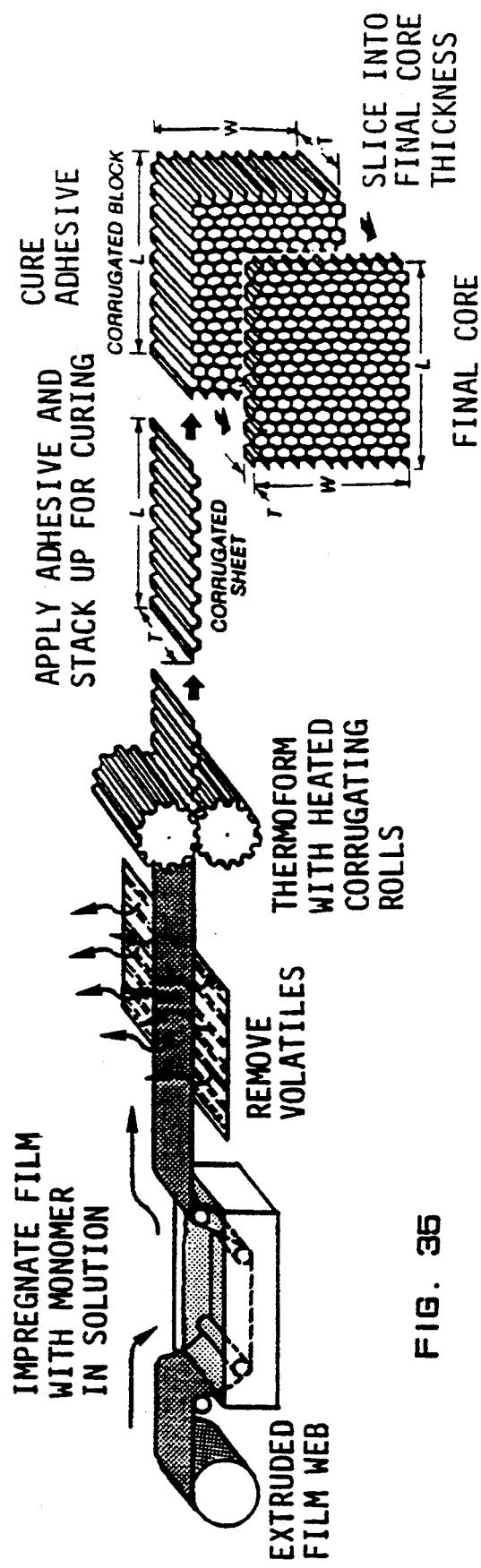
FIG. 35 is a schematic diagram showing an alternative method of processing film from extruded film to final core.

Other continuous corrugating methods can be employed. For example, a corrugating process illustrated in FIG. 35 for fabricating ultralightweight cores takes the extruded films through impregnation, thermal shaping, adhesive application and stacking for final cure at a high production rate. Novel cutting tools, such as excimer lasers and high-pressure water jets, allow thin-walled honeycomb cores having complex contours to be machined to tight geometrical tolerances as required of parabolic antenna dishes, optically flat benches and arrays.

The ordered-polymer films, such as PBZT and PBO, can be tailored by the impregnation process with respect to their strength and stiffness properties. Experimentally determined elastic constants of the ordered-polymer films provide direct comparison of their behavior with laminated plate theory. Resin contents of impregnated films can be varied to determine the extent of property loss as a function of the volume percent of resin used. The coefficient of thermal expansion may also be affected. A higher resin content may lead to higher or lower CTE, depending on the specific resin system used. Finally, various high-performance, psuedo-thermoplastic resins, such as PMR-15, are usable as compatible matrices. These variations have the potential of further improving the performance of ULW structures.

Larger core sizes (up to $6 \times 6$ in.) can allow other stiffness properties to be controlled. In-plane buckling as well as plate shear performance can be improved. Improvements in fabricating cores and larger sample size will improve flatwise compression modulus. Core walls of different orientations and thickness can be specified, depending on specific performance requirements, to test the predictions of the design analysis. Finally, different facesheet materials can be applied to the core to provide different sandwich stiffness properties. As small cell sizes (0.125 in. or less) are now possible, ultra-thin facesheet materials such as PBZT or PBO can be applied to the already ultralightweight PBZT cores for further improvements in specific stiffness properties.

The high-modulus, ordered-polymer film represents a new class of high performance structural materials that meets the severe requirements of space-based. SDI system. Ordered-polymer films can be applied to other ultralightweight structures of unique designs, such as those illustrated in FIGS. 5($a$)-5($g$).

Although the present invention has been described in relation to particular embodiments thereof, the scope of the appended claims is not limited by the specific disclosure herein, but rather includes many variations and modifications and other uses, which will become apparent to those skilled in the art.

REFERENCES

1. Andriulli, J.B., et al., *Annual Program Report: Thermoplastic Composites for Space Applications,* Oak Ridge Nat'l Lab., Oak Ridge, Tenn., September 1988, pp 6–15, 20, 29–31.

2. Haplin, J.C., *Primer on Composite Materials: Analysis,* Technomic Publishing, 1984, pp 1–33.

3. Lusignea, R., J. Racich, and W. Ishida, *Processing of Rod-Like Polymers,* Interim Report, October 1983–1985, AFWAL-TR-86-4046.

4. Lusignea, R., and J. McCoy, *Ordered Polymers for Large Mirror Substrates,* Final Report, January 1985–November 1986, AFWAL-TR-87-4029.

5. Harris, B., *Engineering Composite Materials,* The Institute of Metals, 1986.

6. Tsai, S.W. and H. Thomas Hahn, *Introduction to Composite Materials,* Technomic Publishing Co., 1980, pp. 1–98.

7. Bruhn, E.F., "Sandwich Construction and Design," *Analysis and Design of Flight Vehicle Structures,* Tristate Offset Company, Cincinnati, Ohio, 1965, pp c12.2–c12.7.

8. Bitzer, T.N., and J.J. Castillo, "Graphite Honeycomb," Proceedings from 33rd International SAMPE Symposium, March 7–10, 1988, pp 73–77.

9. Vinson, J.R., and S. Shore, "Methods of Structural Optimization for Flat Sandwich Panels," U.S. Naval Air Engineering Center Technical Report NAEC-ASL-1083, 1965.

10. Vinson, J.R. and Sierokowski, *Composite Materials and Their Use as Structures,* Wiley & Sons, 1975, pp 82–83, 104–113.

11. Klapprott, David, Hysol Corporation, personal communication, March 1989.

12. Rosen, B.W., "A Simple Procedure for Experimental Determination of the Longitudinal Shear Modulus of Unidirectional Composites," J. of Composite Materials, October 1972, pp 552–554.

13. Tsai, S.W., *Composites Design,* United States Air Force Materials Laboratory, Think Composites, Dayton, Ohio, 1986, pp 7-1–7-18.

14. Schwartz and Rosato, "Structural Sandwich Construction," *Composite Engineering Laminates,* A.G. Dietz, ed., MIT Press, 1960, pp 173–174.

TABLE 1-1

Honeycomb Core Property Comparison Based on 5.0 pcf, 0.50 in. Thick Cores

| Core Type | Shear Strength (MPa) | (psi) | Shear Modulus (MPa) | (Ksi) | Specific Shear Modulus (m) | (in) |
|---|---|---|---|---|---|---|
| PBZT/PMR-15 | 2.22 | 322 | 576 | 98* | 863 × 10³ | 34 × 10⁶ |
| Graphite/Phenolic | 3.13 | 455 | 634 | 92 | 813 × 10³ | 32 × 10⁶ |
| Graphite/Polyirride | 3.29 | 478 | 523 | 76 | 660 × 10³ | 26 × 10⁶ |
| 5052 Aluminum | 2.80 | 410 | 537 | 78 | 686 × 10³ | 27 × 10⁶ |
| Fiberglass | 2.80 | 410 | 248 | 36 | 305 × 10³ | 12 × 10⁶ |
| Nomex | 2.24 | 325 | 76 | 11 | 101 × 10³ | 4 × 10⁶ |

*Value based on results of four point flexural test (ASTM C-393). All other values reported based on plate shear test in flatwise plane (ASTM C-273).

TABLE 1-2

Coefficient of Thermal Expansion (CTE) for Several Honeycomb Cores of 10 v/o Resin Content

| Sample Type | CTE ppm/°C. | ppm/°F. |
|---|---|---|
| PBZT/PMR-15 | −0.3 | −0.1 |
| PBZT/TACTIX | −0.4 | −0.2 |
| Graphite/Phenolic (HFT-G) | 0.5 | 0.3 |
| Keviar/Epoxy (HRH-49) | 2.0 | 1.1 |

TABLE 1-2-continued

Coefficient of Thermal Expansion (CTE) for Several Honeycomb Cores of 10 v/o Resin Content

| Sample Type | CTE ppm/°C. | ppm/°F. |
|---|---|---|
| Fiberglass/phenolic (HRP, HFT) | 7.6 | 4.2 |

TABLE 3-2

Honeycomb Property Comparisons (all 5.0 pcf, 0.50 in. Thick Cores)

| | Compression Stabilized | | Plate Shear | | | |
|---|---|---|---|---|---|---|
| | | | "L" Direction | | "W" Direction | |
| Core type | Strength (psi) | Modulus (Ksi) | Strength (psi) | Modulus (Ksi) | Strength (psi) | Modulus (Ksi) |
| Graphite (HFT-G) | 940 | 103 | 455 | 92 | 290 | 35 |
| Aluminum (5052) | 645 | 180 | 410 | 78 | 262 | 34 |
| Fiberglass (HFT) | 775 | 60 | 410 | 36 | 200 | 13 |
| "Nomex" (HRH-10) | 810 | 45 | 325 | 11 | 175 | 5 |

From Research and Development, July 1988, p 55.
Note: L direction refers to ribbon direction and W is transverse to ribbon.

TABLE 2-1

Specific Stiffness for PBZT.PBO Films and Gr/Ep or Tp Composites

| | Density | | Tensile Modulus | | Specific Stiffness | |
|---|---|---|---|---|---|---|
| | g/cc | lb/in.³ | GPa | Msi | m × 10⁶ | in. × 10⁸ |
| Anisotropic | | | | | | |
| PBZT film [uniaxial] | 1.55 | 0.055 | 197 | 28.5 | 13.2 | 5.2 |
| | | | 310* | 45.0* | 17.8* | 7.0* |
| PBO film [uniaxial] | 1.60 | 0.056 | 248 | 36.0 | 15.7 | 6.2 |
| Gr/Ep or Tp [0 deg] High modulus | 1.58 | 0.056 | 251 | 36.4 | 16.5 | 6.5 |
| Quasi-isotropic | | | | | | |
| PBZT film [balanced biaxial] | 1.55 | 0.055 | 27 | 3.9 | 1.8 | 0.7 |
| | | | 137* | 20* | 8.1* | 3.2* |
| Gr/Ep or Tp [quasi-isotropic] | 1.58 | 0.056 | 81 | 11.8 | 5.3 | 2.1 |

*target values

TABLE 3-3

Theoretical Stiffness Properties for ±45 deg = Θ Biaxially-Oriented PBZT Film

| Θ (deg) | $E_{11}$ (Msi) | $E_{22}$ (Msi) | $G_{12}$ (Msi) | $v_{12}$ | $v_{21}$ |
|---|---|---|---|---|---|
| 45 | 3.4 | 3.4 | 4.62 | 0.69 | 0.69 |

TABLE 3-1

Calculated Values for Biaxial PBZT Film using Laminate Plate Theory

| Θ (deg) | $E_x$ (Msi) | $E_y$ (Msi) | $G_{xy}$ (MSi) | $v_{xy}$ | $v_{yx}$ |
|---|---|---|---|---|---|
| Case i | | | | | |
| 0 | 30.0 | 3.0 | 0.94 | 0.30 | 0.03 |
| 10 | 27.7 | 2.9 | 1.75 | 0.57 | 0.06 |
| 20 | 20.0 | 2.8 | 3.80 | 1.13 | 0.16 |
| 30 | 10.2 | 2.6 | 6.14 | 1.32 | 0.33 |
| 45 | 3.4 | 3.4 | 7.87 | 0.81 | 0.81 |
| 60 | 2.6 | 10.2 | 6.14 | 0.33 | 1.32 |
| 75 | 2.8 | 24.5 | 2.67 | 0.10 | 0.85 |
| 90 | 3.0 | 30.0 | 0.94 | 0.03 | 0.30 |
| Case ii | | | | | |
| 0 | 17.0 | 3.0 | 1.02 | 0.30 | 0.05 |
| 10 | 15.8 | 2.95 | 1.44 | 0.43 | 0.08 |
| 20 | 12.3 | 2.81 | 2.51 | 0.75 | 0.17 |
| 30 | 7.6 | 2.71 | 3.72 | 0.93 | 0.33 |
| 45 | 3.4 | 3.4 | 4.62 | 0.69 | 0.69 |
| 60 | 2.7 | 7.7 | 3.72 | 0.33 | 0.93 |

TABLE 3-1-continued

Calculated Values for Biaxial PBZT Film using Laminate Plate Theory

| Θ (deg) | $E_x$ (Msi) | $E_y$ (Msi) | $G_{xy}$ (MSi) | $v_{xy}$ | $v_{yx}$ |
|---|---|---|---|---|---|
| 75 | 2.9 | 14.4 | 1.92 | 0.12 | 0.59 |
| 90 | 3.0 | 17.0 | 1.02 | 0.05 | 0.30 |

TABLE 3-4

Tensile Strength and Modulus for ±45 deg Neat PBZT and PBZT/Tp Films, Tested in Machine (MD) and Transvers Direction (TD)

| Film Type | Test Direction | Tensile Strength (Ksi) | Modulus (Msi) | % Elongation |
|---|---|---|---|---|
| Neat PBZT | MD | 38.3 | 3.72 | 1.0 |
| (PMR-15 control) | TD | 26.4 | 1.46 | 2.2 |
| PBZT/PMR15 | MD | 29.0 | 1.39 | 3.08 |
| (fully cured) | TD | 34.0 | 1.26 | 4.4 |
| Neat PBZT | MD | 38.1 | 3.26 | 1.2 |
| (Tactix 695 control) | TD | 32.9 | 1.68 | 3.3 |
| PBZT/Tactix 695 | MD | 14.9 | 0.974 | 1.7 |
| (fully cured) | TD | N/A | N/A | N/A |

Note: All modulus values corrected to 7.0 in. gage length

TABLE 3-5

Core Density, Strength and Stiffness Properties for Two PBZT/Ts Cores

| Sample | Density $\rho_c$ (pcf) | Shear Strength $t_c$ (psi) | Shear Modulus $G_c$ (Ksi) | Specific Shear Modulus $G_c/\rho_c$ (in.) |
|---|---|---|---|---|
| 10 v/o Tacitx/PBZT Honeycomb Core | | | | |
| 4 | 5.35 | 191.0 | 58.7 | $19 \times 10^6$ |
| 5 | 4.71 | 195.0 | 20.0 | $7 \times 10^6$ |
| 7 | 5.11 | 194.0 | 45.7 | $15 \times 10^6$ |
| 10 v/o PMR-15/PBZT Honeycomb Core | | | | |
| 8 | 4.63 | 159 | 46.0 | $17 \times 10^6$ |
| 10 | 5.14 | 248 | 82.6 | $28 \times 10^6$ |
| 11 | 5.18 | 203 | 63.6 | $21 \times 10^6$ |
| 12 | 5.68 | 261 | 112.6 | $34 \times 10^6$ |

TABLE 3-6

Flatwise Compressive Strength and Modulus for PBZT/PMR-15 Honeycomb Core with 0.5 in. Core Thickness

| Core Type | Density (pcf) | Compressive Strength (psi) | Compressive Modulus (Ksi) |
|---|---|---|---|
| PBZT/PMR-15 | 5.20 | 330.0 | 13.7 |
| PBZT/PMR-15 | 5.14 | 322.0 | 13.4 |

TABLE 3-7

Coefficient of Thermal Expansion (CTE) for Several Honeycomb Cores of 10 v/o Resin Content

| Sample Type | CTE ppm/°C | CTE ppm/°F |
|---|---|---|
| PMR-15/PBZT | −0.3 | −0.1 |
| TACTIX/PBZT | −0.4 | −0.2 |
| Graphite/Phenolic (HFT-G) | 0.5 | 0.3 |
| Kevlar/Epoxy (HRH-49) | 2.0 | 1.1 |
| Fiberglass/phenolic (HRP, HFT) | 7.6 | 4.2 |

What is claimed is:

1. An ultralightweight (ULW) shaped structural member formed from a single-layer biaxially-oriented polymer film comprising an ordered rod-shaped extended chain polymer, wherein said polymer is an aromatic heterocyclic polymer selected from the group consisting of poly-(p-phenylene benzobisoxazole) and poly-(p-phenylene benzobisthiozole), wherein said polymer has a binder interpenetrated in the micro-infrastructure, the polymer being infiltrated with the binder to form a microcomposite of the polymer and binder, and wherein said structural member is a honeycomb structure comprising a honeycomb core formed from said film.

2. A structural member as in claim 1, wherein said film is less than about 0.25 mm thick.

3. A structural member as in claim 2, wherein said film is less than about 0.127 mm thick.

4. A structural member as in claim 3, wherein said film is less than about 0.05 mm thick.

5. A structural member as in claim 4, wherein said film is no more than 0.038±0.018 mm thick.

6. A structural member as in claim 5, wherein said film is no more than about 0.025 mm thick.

7. A structural member as in claim 5, wherein the cell size of said honeycomb core is less than about 3.8 mm.

8. A structural member as in claim 7, wherein said cell size is no more than about 3.175 mm.

9. A structural member as in claim 1, wherein the coefficient of thermal expansion in the cell axis direction of said honeycomb core is less than about 1 ppm/°C. over a range from about −50° C. to about +150° C.

10. A structural member as in claim 9, wherein said coefficient of thermal expansion is no more than about 0.3 ppm/°C.

11. A structural member as in claim 1, wherein said core material has a specific shear stiffness of at least about $863 \times 10^3$ m.

12. A structural member as in claim 11, wherein said core material has a specific shear stiffness of at least about $2.54 \times 10^8$ cm.

13. A structural member as in claim 1, further comprising a pair of facesheets applied to said core.

14. A structural member as in claim 13, wherein said facesheets comprise 2-ply uniaxial graphite/epoxy material.

15. A structural member as in claim 13, wherein said facesheets comprise the same material as said honeycomb core.

16. A structural member as in claim 15, wherein said facesheets are less than about 0.25 mm thick.

17. A structural member as in claim 16, wherein said facesheets are less than about 0.127 mm thick.

18. A structural member as in claim 17, wherein said facesheets are less than about 0.05 mm thick.

19. A structural member as in claim 18, wherein said facesheets are no more than 0.038±0.018 mm thick.

20. A structural member as in claim 19, wherein said facesheets are no more than substantially 0.025 mm thick.

21. A structural member as in claim 2, wherein the flexural stiffness of said structure is at least 70,000 psi.

22. A structural member as in claim 21, wherein the core density of said core is no more than about 5 pcf.

23. A structural member as in claim 22, wherein the core density of said core is no more than about 3 pcf.

24. A structural member as in claim 2, wherein the core density of said core is no more than about 5 pcf.

25. A structural member as in claim 24, wherein the core density of said core is no more than about 3 pcf.

26. A process for thermally shaping a honeycomb core which comprises a plurality of substantially hexagonal cells each defining a common cell axis direction, said process comprising the steps of:

providing a mold having two mold halves which together define a plurality of substantially hexagonal mold cells;

placing two sheets of thermally shapable material between said two mold halves and within said plurality of mold cells;

placing a plurality of thermally expandable rods between said two sheets and respectively within said plurality of mold cells; and heating said mold, said sheets, and said rods so as to expand said rods so as to force said sheets to conform to the hexagonal shape of said mold cells, and to cure said sheets, thereby obtaining two thermally shaped sheets which together define said plurality of hexagonal cells each extending in said cell axis direction.

27. A process as in claim 26, wherein said material is a polymer film comprising an ordered rod-shaped extended chain aromatic heterocyclic polymer selected from the group consisting of poly-(p-phenylene benzobisoxazole) and poly-(p-phenylene benzobisthiozole), having a binder interpenetrated in the micro-infrastructure, the polymer being infiltrated with the binder to form a microcomposite of the polymer and binder.

28. A process as in claim 27, wherein said thermally expandable rods comprise polytetrafluoroethylene.

29. A process as in claim 28, wherein said mold is coated with polytetrafluoroethylene.

30. A process as in claim 26, further comprising a step of forming a hexagonal cellular sheet by bonding said two thermally shaped sheets together by a primary bonding step of applying an adhesive material between respective facing surfaces of said sheets, while retaining said rods within said cells so as to interfere with any running of said adhesive into said cells.

31. A process as in claim 30, further comprising cutting said hexagonal cellular sheet along cut lines transverse to said cell axis direction to form a plurality of hexagonal cellular strips;

stacking a plurality of said cellular strips along a plane transverse to said cell axis direction; and bonding said cellular strips by a secondary bonding step of applying an adhesive between respective facing surfaces of said cellular strips which define a secondary bonding plane, while retaining polytetrafluoroethylene rods within secondary cells which are defined between said cellular strips along said secondary bonding plane, to interfere with any running of adhesive into said secondary cells.

32. A process as defined in claim 31, wherein said adhesive is a bisphenol-A-based epoxy.

33. A process according to claim 26, wherein said material is a polymer film comprising a polybenzazole having a binder interpenetrated in the microinfrastructure, the polymer being infiltrated with the binder to form a microcomposite of the polymer and binder.

* * * * *